US011639868B2

(12) United States Patent
Grimm et al.

(10) Patent No.: US 11,639,868 B2
(45) Date of Patent: May 2, 2023

(54) METHOD FOR DETERMINING REMAINING FLUID LEVEL OF OPEN CONTAINER

(71) Applicant: Beverage Metrics, Inc., Highlands Ranch, CO (US)

(72) Inventors: Dean Grimm, Highlands Ranch, CO (US); Daniel Grimm, Littleton, CO (US)

(73) Assignee: Beverage Metrics, Inc., Highlands Ranch, CO (US)

(*) Notice: Subject to any disclaimer, the term of this patent is extended or adjusted under 35 U.S.C. 154(b) by 236 days.

(21) Appl. No.: 17/188,592

(22) Filed: Mar. 1, 2021

(65) Prior Publication Data

US 2021/0270662 A1    Sep. 2, 2021

Related U.S. Application Data

(60) Provisional application No. 62/982,511, filed on Feb. 27, 2020.

(51) Int. Cl.
   *G01F 23/292*    (2006.01)

(52) U.S. Cl.
   CPC ...... *G01F 23/2925* (2013.01); *G01F 23/2928* (2013.01)

(58) Field of Classification Search
   CPC ...... G01F 23/28; G01F 23/282; G01F 23/284; G01F 23/2928; G01F 23/292; G01F 23/2921; G01F 23/2922; G01F 23/2924; G01F 23/2927; G01F 23/2925
   See application file for complete search history.

(56) References Cited

U.S. PATENT DOCUMENTS

| | | |
|---|---|---|
| 6,616,037 B2 | 9/2003 | Grimm et al. |
| 7,768,396 B2 | 8/2010 | Teller |
| 8,453,878 B2 | 6/2013 | Palmquist |
| 9,212,041 B2 | 12/2015 | Keating et al. |
| 9,320,375 B2 | 4/2016 | Sweeney et al. |
| 9,327,960 B2 | 5/2016 | Sweeney et al. |
| 9,382,107 B2 | 7/2016 | Pfeiffer et al. |
| 9,576,267 B2 | 2/2017 | Kundra |
| 9,718,665 B2 | 8/2017 | Wittrup et al. |
| 10,127,520 B2 | 11/2018 | Kundra |
| 10,315,909 B2 | 6/2019 | Wittrup et al. |
| 10,527,480 B2 * | 1/2020 | Cipullo ............. G01B 11/0608 |
| 10,578,475 B2 | 3/2020 | Flockenhaus et al. |
| 10,597,281 B2 | 3/2020 | Chhabra |
| 10,760,943 B2 * | 9/2020 | Hu .................... A61M 37/0015 |

(Continued)

FOREIGN PATENT DOCUMENTS

| | | |
|---|---|---|
| CA | 2925530 A1 | 10/2016 |
| WO | 2007103830 A2 | 9/2007 |
| WO | 2011000021 A1 | 1/2011 |

*Primary Examiner* — John R Lee
(74) *Attorney, Agent, or Firm* — Neugeboren O'Dowd PC

(57) ABSTRACT

Systems, methods, and apparatus for determining a volume of remaining liquid in a container are disclosed. A container profile can first be developed using image analysis to determine a maximum liquid level in the container. The profile can then be broken into divisions, each corresponding to an equal volume. When real-world measurements of a liquid level in a real-world container are made, these can be translated to one of the divisions, which can be summed with all underlying divisions to estimate a volume of remaining liquid in the real-world container.

20 Claims, 21 Drawing Sheets

(56) References Cited

U.S. PATENT DOCUMENTS

| | | | |
|---|---|---|---|
| 2014/0149265 A1* | 5/2014 | Kundra | G06Q 10/087 |
| | | | 705/28 |
| 2017/0067770 A1 | 3/2017 | Sun | |
| 2018/0045548 A1* | 2/2018 | Bender | G01F 23/0007 |
| 2018/0327243 A1 | 11/2018 | Rider et al. | |
| 2018/0328775 A1 | 11/2018 | Gurumohan et al. | |
| 2019/0056258 A1* | 2/2019 | Gelada Camps | G01F 23/2928 |
| 2019/0114580 A1 | 4/2019 | Kundra | |
| 2019/0197466 A1 | 6/2019 | Hand, III et al. | |
| 2019/0335168 A1* | 10/2019 | Laffargue | G01F 25/0084 |
| 2021/0270662 A1* | 9/2021 | Grimm | G01F 23/2928 |

* cited by examiner

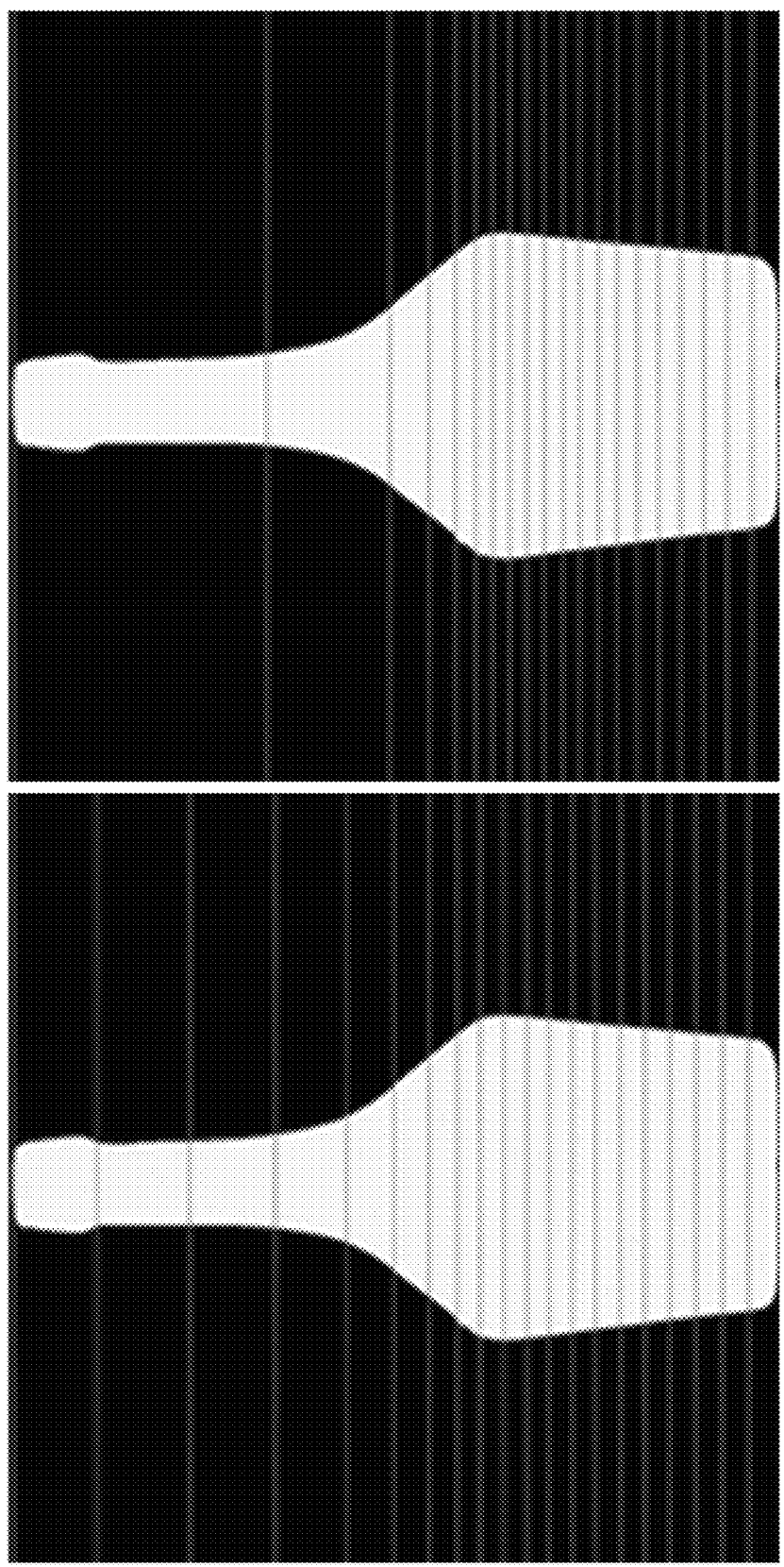

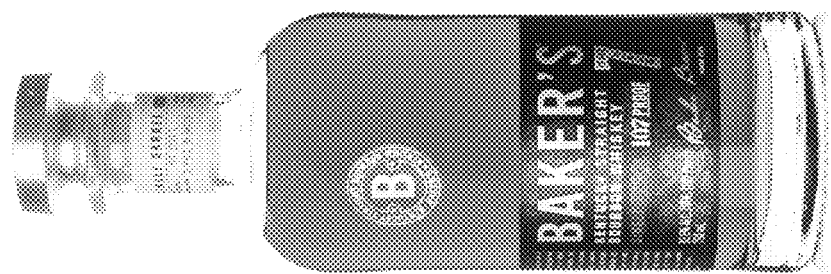
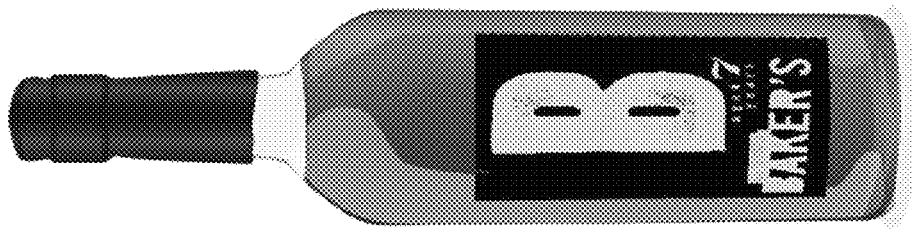
FIG. 18

METHOD FOR DETERMINING REMAINING FLUID LEVEL OF OPEN CONTAINER

CLAIM OF PRIORITY UNDER 35 U.S.C. § 119

The present Application for Patent claims priority to Provisional Application No. 62/982,511 entitled "METHOD FOR DETERMINATING REMAINING FLUID LEVEL OF OPEN CONTAINER" filed Feb. 27, 2020, and assigned to the assignee hereof and hereby expressly incorporated by reference herein.

FIELD OF THE DISCLOSURE

The present disclosure relates generally to inventory management of fluids. In particular, but not by way of limitation, the present disclosure relates to systems, methods and apparatuses for measuring a remaining level of fluid in an open container.

DESCRIPTION OF RELATED ART

Certain items such as food and beverages are often sold and stored in product containers. In many instances, an inventory of content remaining in product containers is taken to determine the number of product containers to purchase. In an example, bar and restaurant operators periodically inventory the amount of alcohol left in bottles to determine the amount of alcohol sold and identify quantity and type of alcohol to be purchased/replenished. Inventory checks also help to identify theft. It is estimated that establishments having inventories of beverages within containers have "shrinkage" rates of 23%. In other words, one in four drinks disappears as a result of theft, spillage, evaporation or unaccounted for consumption. Shrinkage arises in part from a lack of accurate accounting for inventory.

Although point of sale data can be used to estimate the amount/number of beverages consumed during business hours, it does not account for waste, spillage, "free" drinks, or theft. Nor does it account for any inconsistencies in the amount/number of beverages consumed from order to order when liquids are free poured by a variety of employees to fulfill orders. It only provides a count of drinks ordered through this system and estimates the amount/number of beverages consumed based upon an idealized recipe for each sale, i.e., each order is made with the same amount of liquid regardless of who prepares it. Employees may also be unscrupulous in what they do and don't ring up. Therefore, point of sale-based estimates tend to be inaccurate.

Manual estimates of remaining fluid levels are often laborious, imprecise and error prone. For example, it is often difficult for a person to visually determine an amount of liquid beverage remaining in a bottle with precision and in a reliable manner. In commercial settings, the amount of time spent by an employee to manually inventory the remaining content each day (e.g., 5-6 hours) represents a real employment cost realized by the employer.

Automated inventory taking systems have been developed such as those known from U.S. Pat. No. 6,616,037 which defines a computer-based system for taking physical inventory of beverages dispensed in full and partially full containers to control theft and over-pouring. One disclosed embodiment, scans bar codes on the bottles to identify product information about the scanned bottle and provides a silhouette of a bottle to the user on a screen of a computing device. The user indicates, by touching the silhouette of the bottle on the screen, the fluid level within the bottle.

U.S. Pat. No. 10,127,520 determines a liquid level in a liquor bottle by bouncing a signal off the fluid surface within the bottle. The signal is generated, and an interrogator receives the reflected signal, within a pour spout of the bottle. Thus, a custom and complex pour spout is required for every item to be inventoried.

U.S. Pat. No. 10,127,520 determines a liquid level in a liquor bottle by presenting an image of a specific bottle on a touchscreen that a user then touches at a location on the image appearing to line up with a level of liquid in a real bottle having a similar image. No modification to the bottle is required, but human error, inconsistencies in label placement by manufacturers, and label damage all can lead to inaccuracies in this method.

U.S. Pub. No. 2019/019,7466 uses image analysis of an image of a bottle to estimate a fluid level. This method is hampered by the accuracy of the captured image, consistency between different image captures, and the software's ability to address subtleties of image analysis such as the following: lighting, tone, bottle shape, visual "noise" behind the bottle and nearly opaque bottles.

U.S. Pat. No. 8,453,878 uses a liquid-sensing stick extending from a bottom of a pour spout to determine real-time changes in liquid level within a liquor bottle. Since bottles come in a variety of shapes and sizes, this method suffers from the need to manufacture pour spouts with various stick lengths and shapes as well as the inaccuracy of these sticks near the bottom of the bottle.

U.S. Pub. No. 2017/0314,981 relies on weighing a bottle at different times to estimate a liquid volume. Weighing containers is problematic because this method assumes that empty containers have a consistent weight—not always true where high-end products use hand-blown glass.

U.S. Pat. No. 9,212,041 measures a volume of liquid passing through a complex pour spout to estimate changes in liquid level within a liquor bottle. Such a pour spout is likely purchased for every container, adding considerable expense to an operator's current budget.

U.S. Pub. No. 2017/006,7770 determines a liquid level in a bottle based on a pressure sensor arranged near a bottom of the bottle. Modifying the bottle to include a pressure sensor as well as inaccuracies in the sensor and conversion from pressure to volume limit the desirability of this method.

Some known methods rely on a tilt sensor combined with a timer to estimate a change in volume based on an estimate of a volume poured. For instance, U.S. Pat. No. 9,327,960 relies on such an approach.

However, all the known approaches suffer from inaccuracy, complexity, cost, and/or difficulty of use.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a method of contactless estimation of a volume of liquid in a real-world container. The method can include creating a profile of a digital container comprising a plurality of equal-volume divisions. The method can further include estimating the volume of liquid in the real-world container corresponding to the digital container by: generating a digital indicator representative of a liquid level in the real-world container; identifying one of the plurality of equal-volume divisions in the profile that is closest to the liquid level in the real-world container; and calculating a sum of volumes for the identified one of the plurality of equal-volume divisions as well as ones of the equal-volume divisions below the identified one of the plurality of equal-volume divisions to estimate the volume of liquid in the real-world container. In some embodiment, a second profile can be created. This second profile can include a second image of a second real-world container for a container of the same brand and type as the first real-world container, but perhaps having a different shape or size. The user can opt to select either profile resulting in a change between the first and second images, as well as the data underlying the two profiles.

Other embodiments of the disclosure may also be characterized as a method of generating a profile for a container. The method can include obtaining an elevation view image of a container having liquid therein. The method can also include replacing a background of the elevation view image with first pixels that are highly contrasted relative to a foreground of the elevation view image. The method can further include identifying second pixels in the foreground of the elevation view image not associated with the liquid in the container and replacing the second pixels not associated with the liquid in the container with the first pixels that are highly contrasted pixels. The method can yet further include converting remaining pixels that are not the first pixels of the elevation view image to a common type of pixel, and determining a cross-sectional shape of the container. The method can also include accessing an equation for an area of the cross-sectional shape as a function of an elevation, e, and a first width of the common type of pixel in the elevation view image at the elevation, e. The method can yet further include calculating a maximum volume associated with the common type of pixel by adding together solutions to the equation at each row of the common type of pixel. Further, the method can include dividing the maximum volume into the plurality of equal-volume divisions. The profile can comprise the elevation view image, the maximum volume associated with the common type of pixel, a number of the plurality of equal-volume divisions, and a volume per equal-volume division.

Other embodiments of the disclosure can be characterized as a method of contactless estimation of a volume of liquid in a real-world container. The method can include creating a profile of a digital container and estimating a volume of liquid in the real-world container using the profile and a digital indicator indicative of a liquid level in the real-world container. The profile can be created by obtaining an elevation view image of a second real-world container having liquid therein; replacing a background of the elevation view image with pixels that are highly contrasted relative to a foreground of the elevation view image; and replacing pixels in the foreground of the elevation view image with a common type of pixel. The profile can further be created by identifying pixels in the foreground not associated with the liquid in the digital container and replacing the pixels not associated with the liquid in the digital container with the pixels that are highly contrasted. The profile can further be created by determining a cross-sectional shape of the digital container. The profile can further be created by accessing an equation for an area of the cross-sectional shape as a function of the elevation, e, and a width of pixels in the elevation view image at the elevation, e. The profile can further be created by calculating a maximum volume associated with the common type of pixels by adding together solutions to the equation at each row of the common type of pixels; and dividing the maximum volume into equal-volume divisions. The profile can comprise the elevation view image, the maximum volume associated with the common type of pixels, a number of the equal-volume divisions, and a volume per equal-volume division. The common type of pixel can be selected from the group comprising white and at least partially transparent pixels.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 10A shows a PROFILEMASK broken into equal-area regions, or divisions;

FIG. 10B shows a PROFILEMASK broken into equal-volume regions, or divisions;

FIG. 18 shows an embodiment of a user interface for selecting between two profiles for a similar brand/make of a liquor bottle;

DETAILED DESCRIPTION

The word "exemplary" is used herein to mean "serving as an example, instance, or illustration." Any embodiment described herein as "exemplary" is not necessarily to be construed as preferred or advantageous over other embodiments.

The present disclosure relates generally to inventory management of fluids. In particular, but not by way of limitation, the present disclosure relates to systems, methods and apparatuses for more accurately monitoring a remaining volume of fluid in an open container.

This disclosure removes inaccuracies that plague the prior art by providing the user tools to more accurately measure a height of remaining liquid, and uses that measurement along with more complex and accurate container profiles to determine accurate volumes of remaining liquid. Thus, this disclosure can be broken into three parts: (1) improved container profiling; (2) improved liquid level measurements; and (3) volume determination.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Container Profiling

Figure 1:
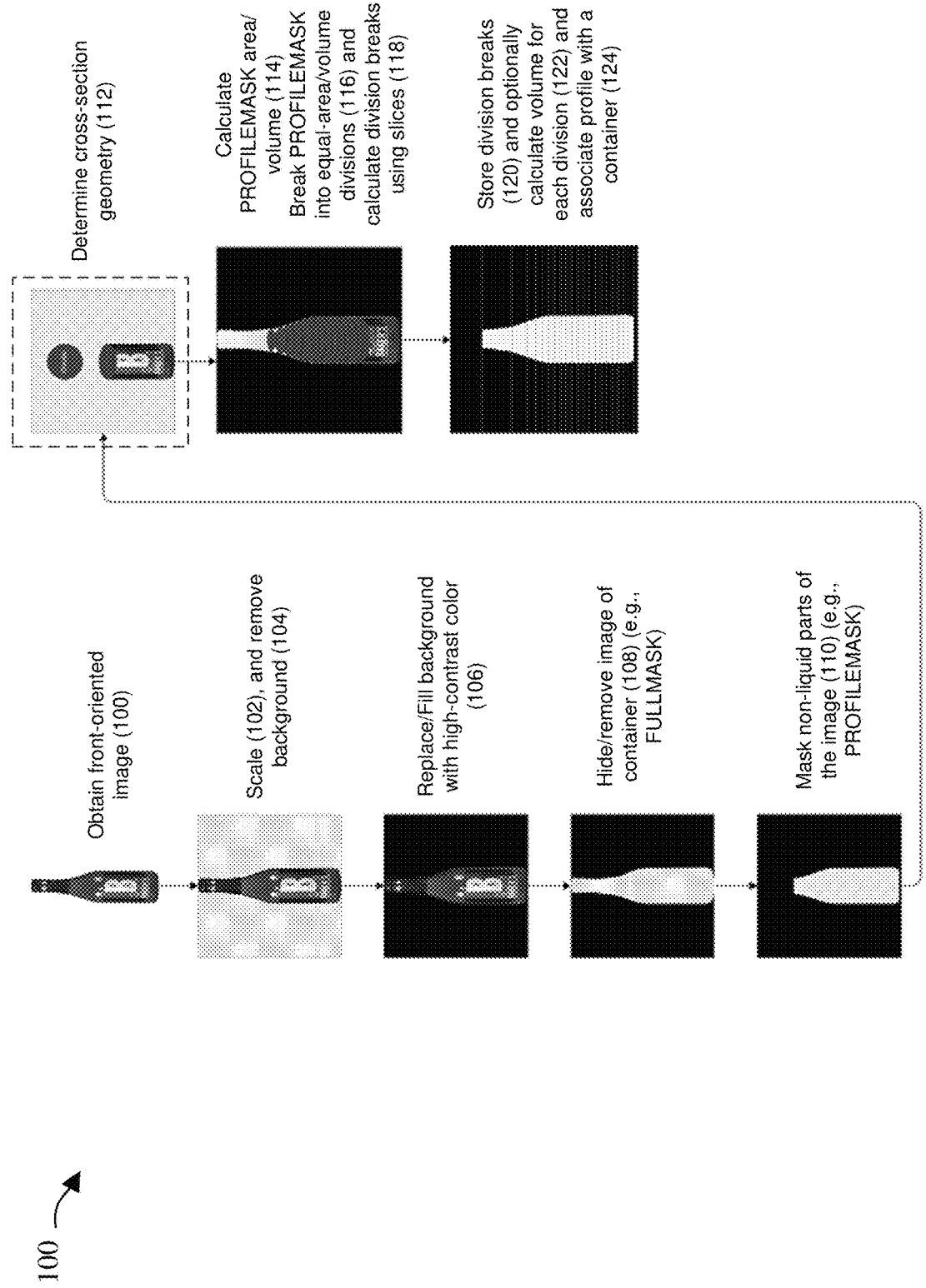
FIG. 1 shows an embodiment of a method for contactless estimation of a volume of liquid in a real-world container.
Figure 16:
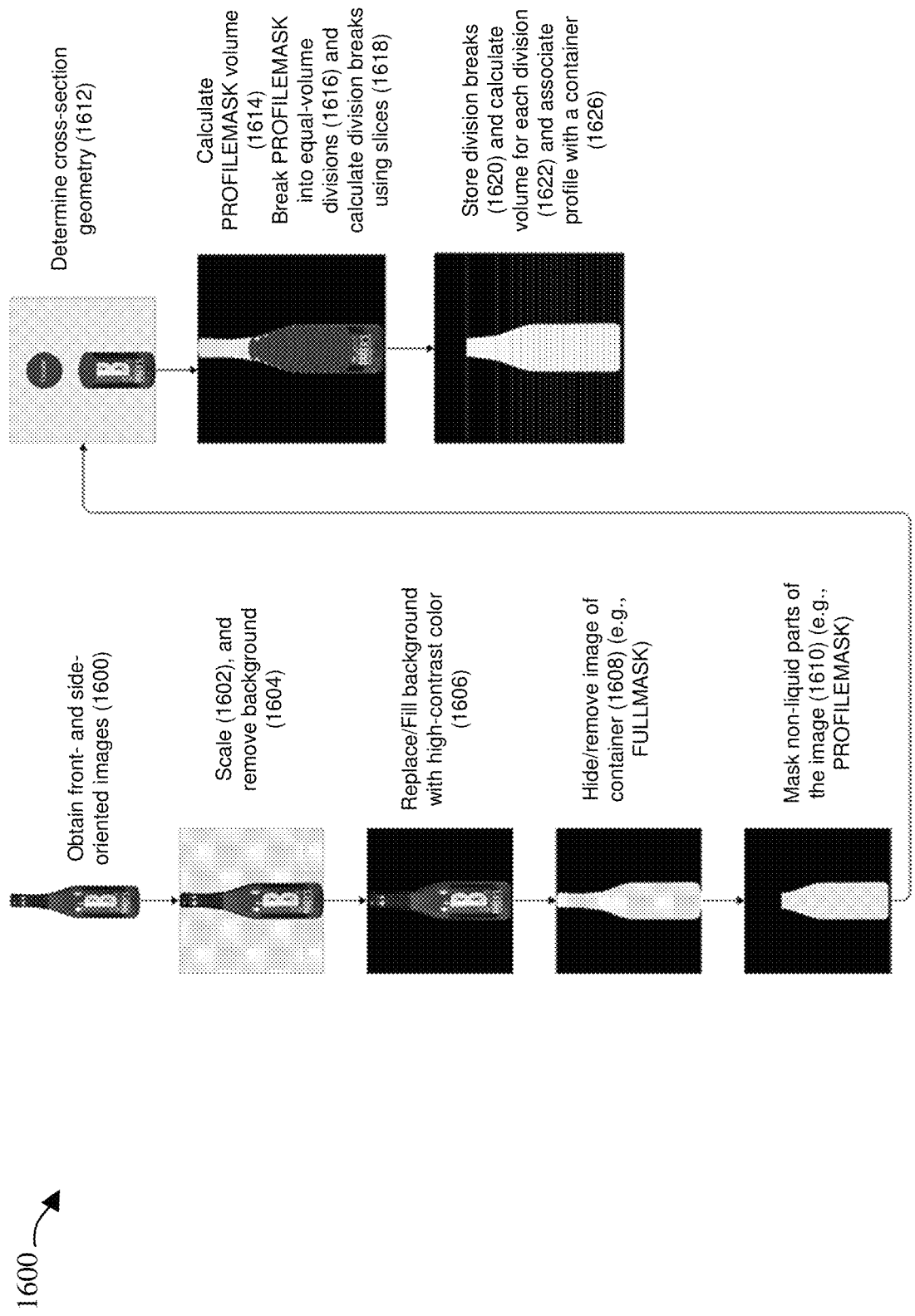
FIG. 16 shows another embodiment of a method for contactless estimation of a volume of liquid in an asymmetric real-world container.

Container profiling (e.g., see the method in FIGS. 1 and 16), can begin with creation of a container image mask (Blocks 100-108). This can include obtaining a front-oriented image of the container (Block 100), scaling the image to a predetermined size (Block 102), and removing the background (Block 104) (or isolating the container from the background). The background can then be replaced or filled with a high contrast color (e.g., black, bright blue, or bright green) (Block 106), and the container image can be hidden by removing the image of the container (Block 108), or converting these non-background pixels to a common type (e.g., to all white pixels), which is made easier via the use of the high-contrast background color. This masked outline of the container can then be saved as what will be referred to as a FULLMASK. The front-oriented image of the container can be extracted from supplier databases or the INTERNET. In some cases, a user can provide a photo of an unknown container, and this can be used as a basis for obtaining a more accurate and detailed front-oriented image of a container matching the user-supplied photo.

Figure 9A:
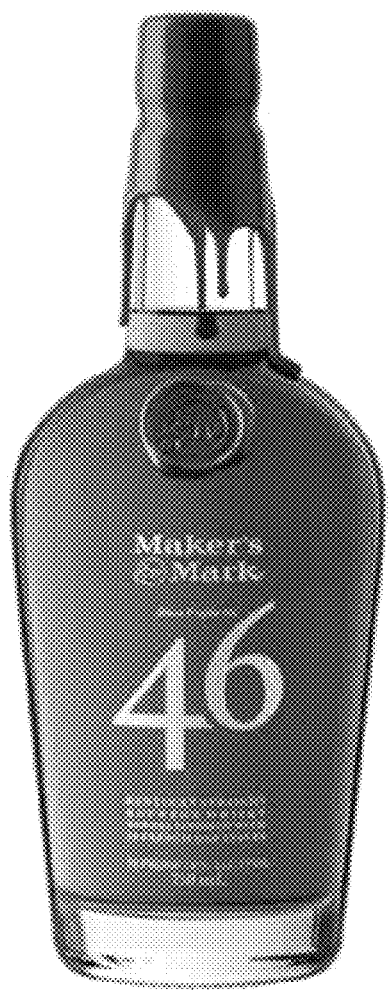
FIG. 9A illustrates an embodiment of an elevation view image of a liquor bottle.
Figure 9B:
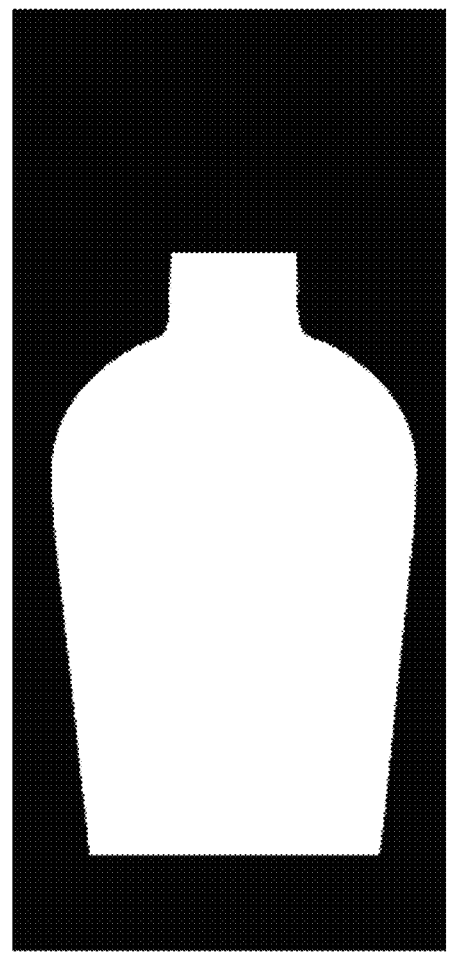
FIG. 9B illustrates an embodiment of a PROFILEMASK formed from the elevation view image of FIG. 9A.
Figure 11:
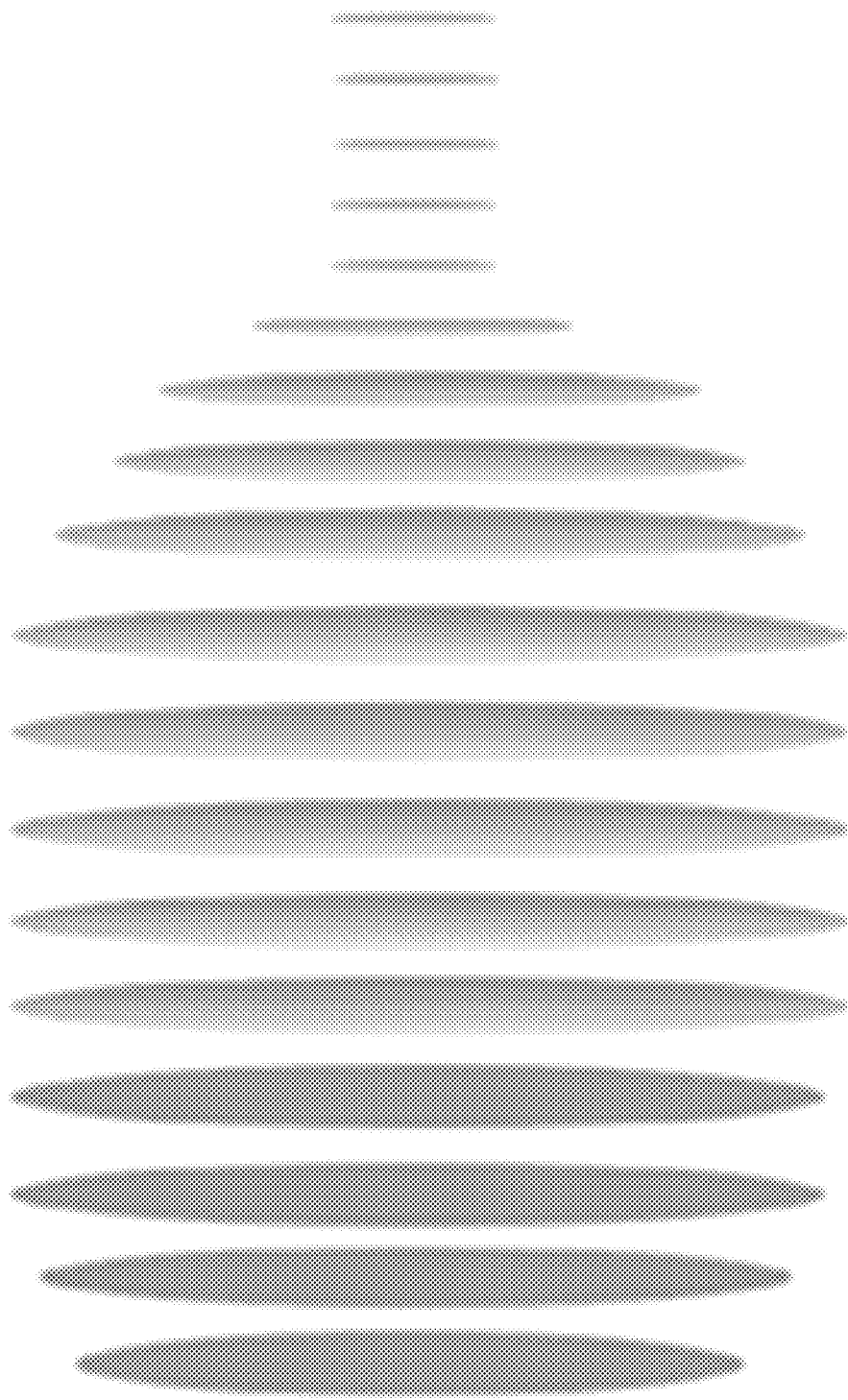
FIG. 11 illustrates an embodiment of division breaks for a digital container.

Non-liquid parts of the masked container can then be filled with the high-contrast background color (e.g., black) (Block 110). For instance, it may be known that a top 2" of a bottle always contains air, that a cork fills a top 0.5" of a wine bottle, or that thick glass is found in the bottom 0.75" of a bottle, and these "unfilled" portions of the container can be "masked" or turned to the high-contrast background color. This version of the liquid-only mask can be referred to as a PROFILEMASK. An example of a PROFILEMASK (see FIG. 9B) and the original container image (see FIG. 9A) can be seen in FIG. 9. In some cases, the non-liquid portion of the container image can be converted to the high-contrast background color before the FULLMASK is created (i.e., Blocks 108 and 110 can be flipped in order).

The PROFILEMASK can then be analyzed to determine an area thereof (e.g., Block 114). For instance, a number of white or transparent pixels (e.g., those with an alpha value) in each row of the PROFILEMASK can be counted and then summed for all rows to estimate an area of non-background or liquid pixels. Other methods of counting the non-background pixels can also be implemented. It should be noted that this disclosure uses white pixels to represent an area or volume of the liquid, but any other color or transparency level that is different from the background color can also be used.

Returning to FIG. 1, given the PROFILEMASK (Block 110), the development of a container's profile can continue by determining a 2D area of the PROFILEMASK (Block 114), and breaking the PROFILEMASK area into equal-area or equal-volume divisions (Block 116). The optional cross-section geometry block 112 may be used where a volumetric approach is taken.

For the area-based approach to determining divisions, the method 100 can skip block 112, and instead break the PROFILEMASK into equal-sized regions called "divisions" (Block 116). For instance, FIG. 10a shows a PROFILEMASK (e.g., a masked side view of a container) broken into equal-area regions, or divisions. Simple shapes may be easy to split into divisions as each division may have the same height (e.g., a cylindrical bottle). However, for more complex shapes, like that shown in FIG. 10, where the width changes as a function of elevation, e, different divisions may have different heights in order to maintain equal areas per division (as measured in pixels). For instance, near a top of a bottle, the height of divisions may increase.

For the volumetric, or volume, or 3D approach to determining divisions, the method 100 can identify a cross sectional representation of the container (Block 112). For instance, a circular cross section, common to many containers, could lead to an equation for the area of the cross-section A as a function of elevation, e, as:

$$A(e) = \pi \frac{D(e)^2}{2}$$

Where D is the pixel width of the container's image. For a square-shaped container, the area of the cross-section A as a function of elevation, e, as:

$$A(e)=D(e)^2$$

While the 3D "volumetric" approach provides greater accuracy, the 2D method can still be an accurate enough estimation in many cases, while cutting down on memory and processing resources.

Determining divisions starts with a desired number of divisions, and then divides the PROFILEMASK area (total pixels in the non-masked region) by the number of divisions for the 2D approach, or divides the PROFILEMASK volume (sum of cross section areas for all elevations, e, or integration over the area equation from 0 to $e_{max}$) by the number of divisions for the 3D approach (Block 116). For both approaches, this gives a target number of pixels per division, called a PIXELS_PER_DIVISION.

Regardless of whether the 2D or 3D approach is used to determine the target pixel count per division, the method 100 can then determine division breaks (Block 118). For each pixel row or elevation, e, the method 100 can again count a number of non-masked pixels to determine a pixel width or width of a slice (or refer back to these same counts made during Block 114). The pixel count can be tallied for succeeding slices until the tally equals the target number of pixels for a division (this target having been determined using the 2D or volumetric approach). For the 2D approach, the method 100 tallies rows of pixels to arrive at an area calculation for each division, and for the 3D approach, the method 100 tallies a "volume" of pixels until the target number (or volume) of pixels is reached for a given division. This volume can be determined by taking a width of a row of pixels as an input to the cross-sectional area equation for the container. Either way, when the tally reaches the target number of pixels per division, the row identity or elevation, e, can be identified (Block 118) as a break, and once a break has been found for all divisions, the break locations, or elevation, e, can be stored in memory (Block 120).

For each division a volume can be determined by, in the 2D approach, finding an area of each slice and summing these slice areas (or integrating over a division) (Block 122). A slice area can be found as discussed above, by multiplying the pixel width for a given slice by a cross-sectional area at the same elevation. In the 3D approach, the volume of the PROFILEMASK and the divisions will have already been determined and can be stored now or may already have been stored when determined when the number of divisions was found.

The two-dimensional or three-dimensional profile can be associated with a container/product profile (Block 124). The profile can then be used alongside a measurement of liquid height (e.g., see FIGS. 2-7 and 17) to more accurately estimate liquid volume observed in a real-world container.

FIGS. 10*a* and 10*b* show a PROFILEMASK broken into an equal number of divisions, but 10*a* using the 2D area method and 10*b* using the volumetric method. 10*b* shows further improvements in accuracy when the volumetric method is followed (e.g., including Block 112). In particular, using the volumetric method, there are fewer divisions at the top of the bottle because there is far less volume at the narrowest regions of the bottle than is calculated by the two-dimensional or area method (i.e., the method excluding Block 112).

For the purposes of this disclosure, an area refers to a two-dimensional shape parallel to a plane of the figures. As an example, the PROFILE_MASK is an area. In contrast, a cross-sectional area refers to a two-dimensional shape perpendicular to the figures. As an example, when looking down on a bottle, the cross section seen from above would be a cross-sectional area.

Asymmetric Containers

Figure 12:
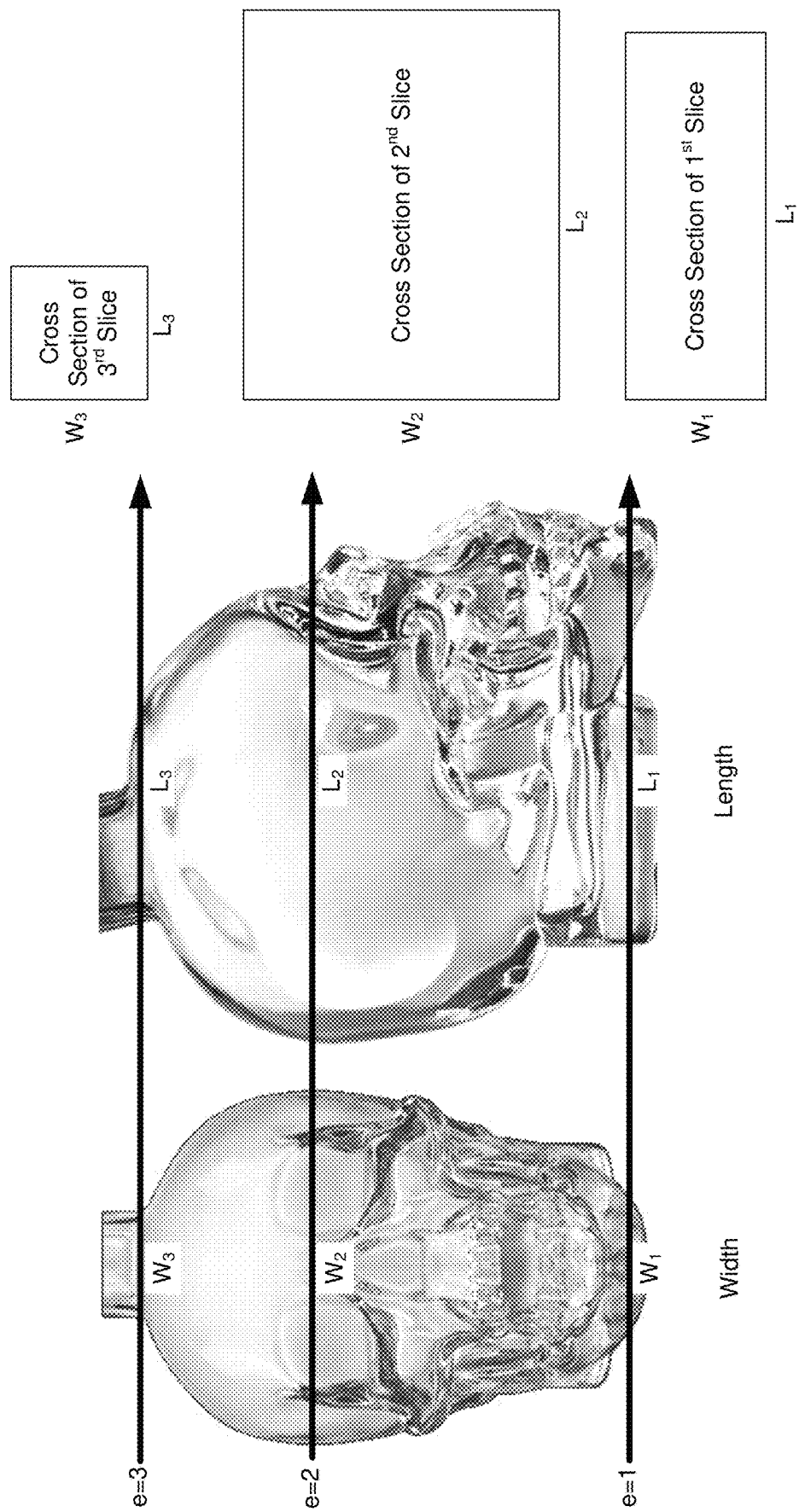
FIG. 12 illustrates a complex or asymmetric container where a first image from a front and a second image from a side (~90° to the first image) is used to profile the container.

In the case of an asymmetric container, such as the one shown in FIG. 12, the enhanced accuracy of a volumetric approach to slices is even more apparent. In this case, two images of a container at perpendicular angles to each other can be used as the starting point for a method 1600 similar to the method 100 of FIG. 1. In order to calculate the volumetric area of a slice, the method 1600 assumes a cross sectional shape for the slice, such as a rectangle, ellipse, etc. For both the area of an ellipse and a rectangle, the equations take a length and width as inputs, and these two different values can be taken as the pixel width of a selected row/elevation for the first and second images.

More specifically, the method 1600 can obtain a first image of the front of the container, and a second image of the side of the container (Block 1600). The method 1600 can then scale both images to predetermined sizes (Block 1602), and remove the background (Block 1604) (or isolating the container from the background). The backgrounds can then be replaced or filled with a high contrast color (e.g., black, bright blue, or bright green) (Block 1606), and the container images can be hidden by removing the images of the container (Block 1608), which is made easier via the use of the high-contrast background color. These masked outlines of the container can then be saved as what will be referred to as a FULLMASK.

Non-liquid parts of the masked container can then be filled with the high-contrast background color (e.g., black) (Block 1610). This version of the liquid-only mask can be referred to as a PROFILEMASK. Given the PROFILEMASK (Block 1610), the development of a container's profile can continue by deriving a cross section equation for the container based on the two views (Block 1612), determining a 3D volume of the PROFILEMASK based on both views (Block 1614), breaking the PROFILEMASK volume into equal-volume divisions using the volumetric approach (Block 1616), and calculating division breaks (Block 1618).

More specifically, the two views can be used to develop the cross-section geometry (Block 1612) as an approximation of the container's cross section. For instance, FIG. 12 uses a rectangle with width W and length L, where the width and length are derived as pixel widths from the obtained front image and side image. The cross section can then be formed as a function of elevation. For instance, in FIG. 12 the cross section can be written as W(e)×L(e), which allows each slice to be approximated by a rectangle having different ratios of W and L. For instance, the length in the first and second slices is roughly the same, while the width increases significantly for the second slice.

The cross section for each slice can then be summed to determine a volume for the container (Block 1614), or an equation of the cross section can be integrated over 0 to $e_{max}$ to determine an even more accurate container volume. With the PROFILEMASK volume known, the method 1600 can break the volume into equal-sized regions called "divisions" (Block 1616). For instance, FIG. 10*b* shows a PROFILEMASK (e.g., a masked side view of a container) broken into equal-volume regions, or divisions. Given the changing cross section of the container as a function of elevation, each division is likely to have a unique height.

Calculating divisions (Block 1616) can begin by determining a desired number of divisions for the container and then dividing the PROFILEMASK volume (total pixels in the non-masked region) by the number of divisions. This gives a target number of pixels per division, called a PIXELS_PER_DIVISION. A greater number of divisions allows for a more accurate container profile and also allows for more accurate volume indications when the profile is put into use, but also uses more memory and processing resources.

More specifically, the method 100 sums the cross sections of the slices or integrates over the equation of the cross section from 0 to $e_{max}$. The cross section at each slice can be determined by taking the PROFILEMASK width at an elevation e for both views, and using these two widths in combination to obtain a cross section. For instance, for a rectangular or roughly rectangular container (e.g., FIG. 12), the widths from the two images can be multiplied to find an area of a rectangle. However, for more complex shapes, like an ellipse, more complex area equations can be implemented. The container volume can then be broken into equal-volume divisions to obtain a target pixel count per division (Block 1616).

The method 1600 can then determine division breaks by tallying areas of succeeding slices until the target pixel count is reached (Block 1618). This elevation can then be stored (Block 1620) as a division break and breaks can continue to be identified until $e_{max}$.

For each division a volume can be determined by summing the areas of each slice in the division, or integrating over the cross section equation for the elevation at a bottom of the division through the top of the division (Block 1622). The volume for the divisions can be stored along with the container volume previously determined, and these values along with the division breaks can be associated with a container (Block 1626) to form the container/product profile.

The two-dimensional or three-dimensional profile can then be associated with a container/product profile (Block 1626). The profile can then be used alongside a measurement of liquid height (e.g., see FIGS. 2-7) to more accurately estimate liquid volume in the container.

In FIG. 12 the cross section is being approximated by a rectangle having a length L and a width W, though an elliptical cross section might also provide a good estimation for this complex shape. Other cross sections known to those of skill in the art may also be implemented. For instance, the area of a beveled rectangle is given as, $A=ab+2r(a+b)+\pi r^2$, where a and b are the length and width for the front and side images, and r is the radius of the bevel at the four corners of the rectangle. As another example, one equation for the area of a rectellipse, is given as, $$A = \frac{8ab\Gamma^2\left(\frac{5}{4}\right)}{\sqrt{\pi}}$$

where a and b are the length and width for the front and side images. As another example, the equation $$\pi \frac{D(e)}{2} b(e)$$

can be used for a cross sectional area where D(e) and b(e) are long and short axes of an ellipse at given elevation, e.

Most containers include a wall thickness (e.g., glass walls of bottles are typically thicker than aluminum can walls), and/or extraneous decorative glass on the external portion of the container, and determination of the cross section may take this wall thickness into consideration. For instance, where a transparent or semi-transparent container is being profiled, image analysis may be able to measure D from an inside edge of the container walls (including the floor) instead of from an outside of the container. However, where an inside edge cannot be visually determined (e.g., where an opaque container is being profiled), it may be possible to account for a wall thickness based on a database of materials.

Other complex profiles such as oval, octagon, trapezoid, rhombus, hexagon, parallelogram, pentagon, star, *Nuphar luteum, Scrophularia nodosa, Equisetum*, Rasberry, and Starfish also have known area equations. This method 1600 of using two images to generate an approximate cross section is useful on most complex shapes (i.e., those having an assymetric cross section when viewed from above).

Figure 13B:
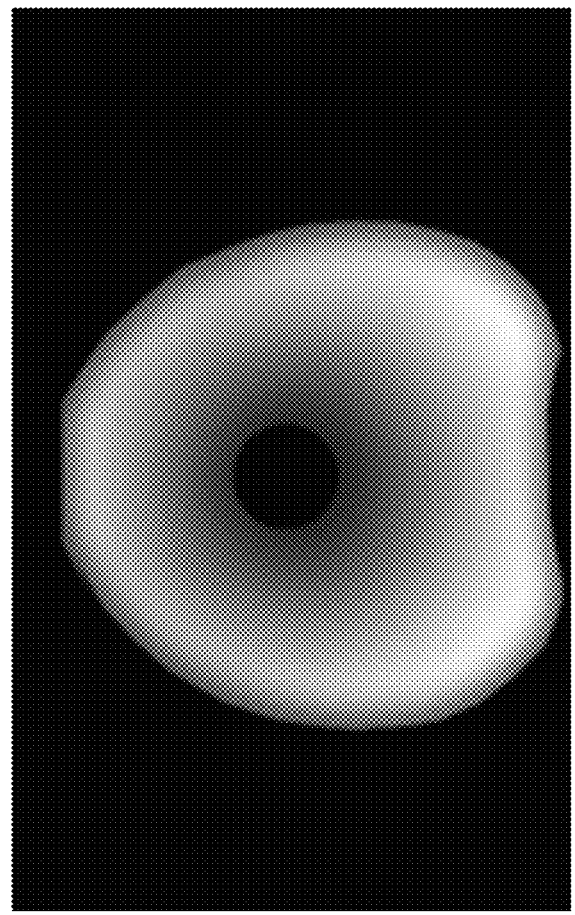
FIG. 13B illustrates an embodiment of a PROFILEMASK formed from the elevation view image of FIG. 13A.
Figure 13A:
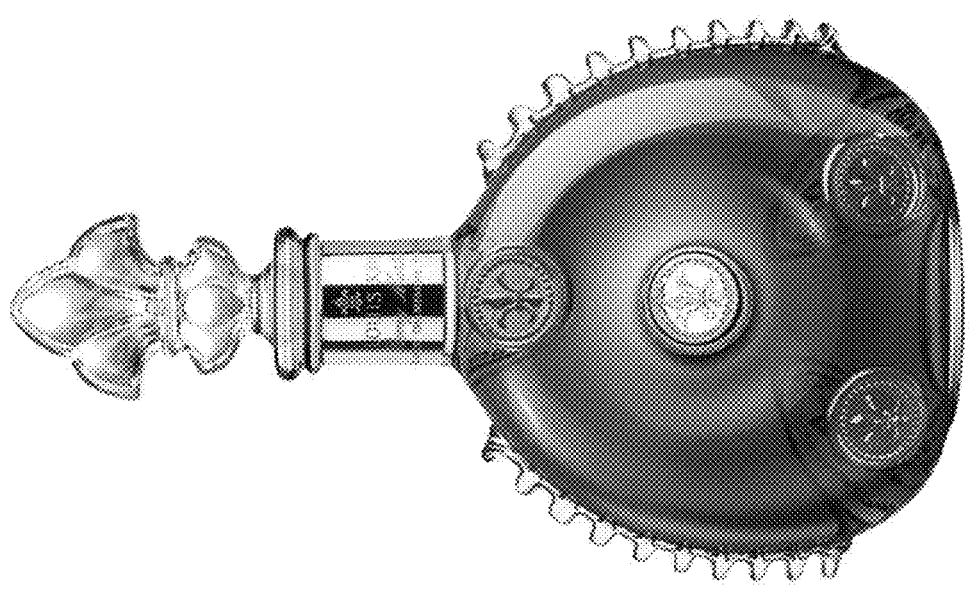
FIG. 13A illustrates an embodiment of an elevation view image of a complex liquor bottle.

In some cases, such as the convex-shaped container of FIG. 13A, even the two-image method described above and shown in FIG. 12 may not provide an accurate container profile. For instance, even taking images from two angles will not be able to account for the concave depression under the central seal in the body of this LOUIS XIII bottle. To handle this type of complexity, a "pixel weight" can be applied to each "white" pixel in the PROFILEMASK. Pixel weight can be represented by an alpha value for each pixel, or a greyscale value where white pixels are closer to the viewer and black pixels are further from the viewer (in other words, lighter pixels correspond to a larger cross section while darker pixels correspond to a smaller cross section). FIG. 13B shows how different weights have been applied to a mask of the bottle in FIG. 13B. The darker region in the middle indicates that the bottle is narrower in that region (further from the viewer) and therefore corresponds with a smaller cross section and thus a smaller volume. In this embodiment, when a cross section is derived for each slice, each pixel's weight (or greyscale value such as 0-255) can be converted to a length such that the cross section is a sum of this length for each pixel in a row. For instance, each pixel can be assigned a value of 0 to 255, where 0 is black and represents no depth, and 255 is white and represents a maximum depth. By summing the value of each pixel in a row and assigning a maximum volume (that may be derived from an image acquired at 90° to the frontal image), a cross sectional area estimate can be calculated for each row.

Figure 14B:
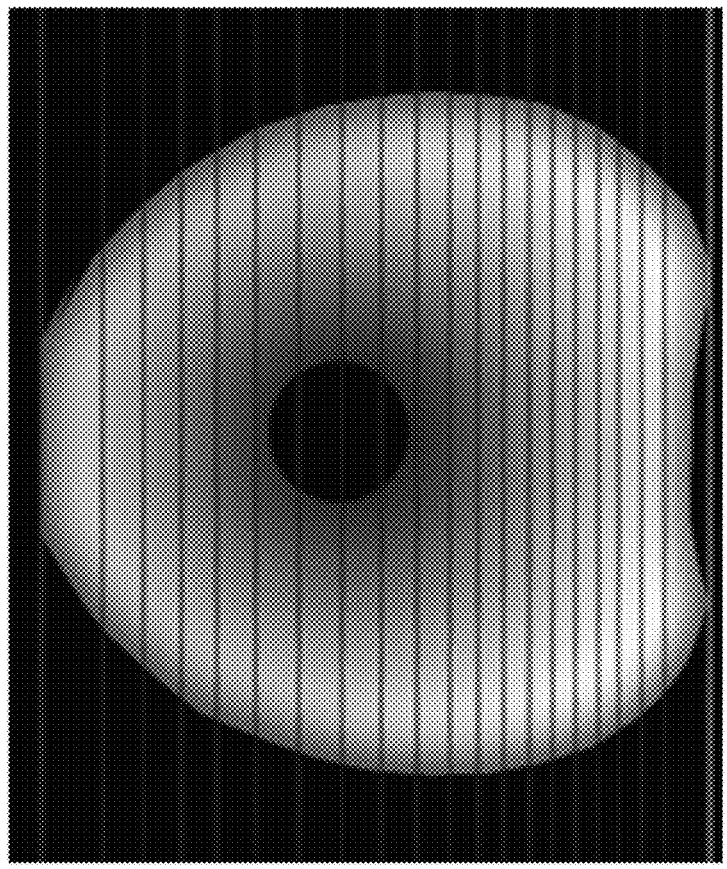
FIG. 14B illustrates the PROFILEMASK of FIG. 13B split into equal-volume divisions, where weighting has been applied to each of the common type of pixels.
Figure 14A:
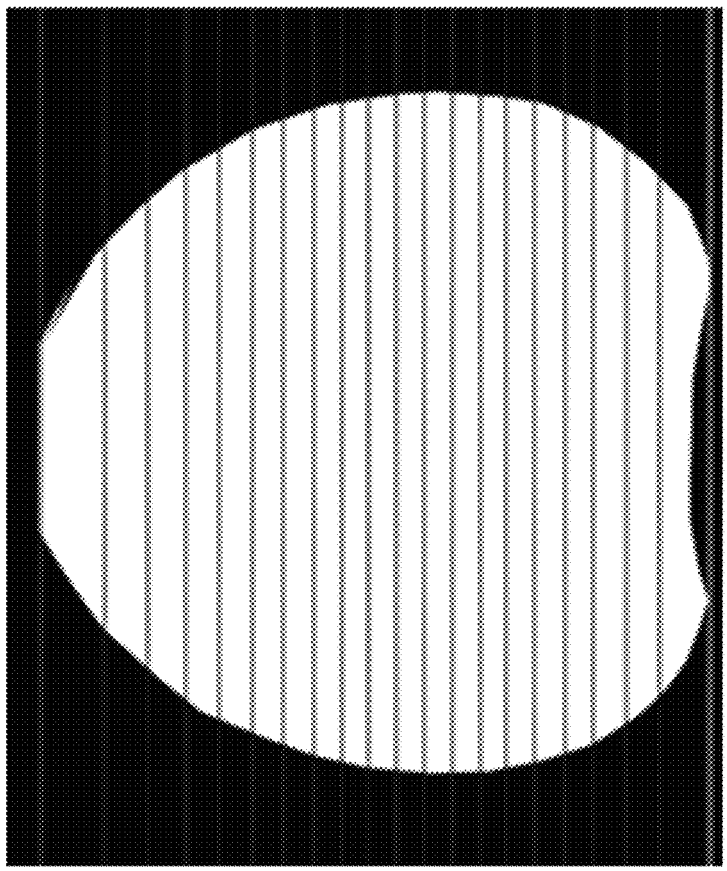
FIG. 14A illustrates the PROFILEMASK of FIG. 13B split into equal-volume divisions.

As with previous methods, once the profile is created, one can determine the total pixel volume of the container, divide by the desired number of slices to yield a PIX_PER_SLICE, and then add each row's cross-sectional area in turn until PIX_PER_SLICE is reached. For instance, FIG. 14A shows the slices for the container of FIG. 13A using the weighted volumetric method described relative to FIG. 13, and FIG. 14B shows the slices for the container of FIG. 13A using a non-weighted volumetric method as described relative to FIG. 10B. One can see that the weighted method leads to taller slices near the middle of the container due to the decreased contribution of the lines caused by the voided area in the middle, and thus a more accurate profile for complex containers such as ones having convex or concave features such as the depression in the middle of the bottle in 13A.

Improved Fluid Level Measurements

One key to improved accuracy is improving upon known methods of determining a height or level of fluid in a container. Existing methods that bounce beams or waves off the surface of a fluid may be too costly or involve undesirable modification to a container or container top. Existing methods that ask a user to touch a reference point on an image that seems to correspond to a liquid level (e.g., the text of a brand name on a liquor bottle) can suffer from inconsistent measurements since stick on labels are not always placed in the same location. This disclosure overcomes these challenges using one of several concepts for more accurately and/or consistently measuring a fluid level.

In an embodiment, a sliding scale (e.g., see 202 in FIG. 2) can be used to measure a height of the fluid as part of a mechanical fluid level indicator. For instance, in FIG. 2, a device 202 can include a measuring means 204 (e.g., a piston or shaft with periodic electromagnetic indicators; an idler wheel or gear that is encoded to measure fractions of rotation; a device for measuring pressure change in a closed chamber) that can be pressed against a surface 208 on which the container is resting and the device 202 can be pressed against the surface 208 until an indicating component 210 is visually aligned with a fluid level 212. The device 202 can then transmit this height measurement wirelessly via a wireless transmitter or antenna 206. Alternatively, the measurement could be recorded manually in a spreadsheet or other software application, or on a piece of paper or other manually inscribed method.

A spring-loaded measuring means 204 may be used to help keep the measuring means 204 extended when it is not being pressed against the surface 208 or to extend it after being pressed against the surface 208. Hydraulic pressure or allowing for gravity to extend the measuring means 204 between containers could also be used. Such a feature allows the user to more quickly move between containers without having to manually extend the measuring means 204 between measurements.

The device 202 may include a measuring component 214 that measures indicators on the measuring means 204 to determine a relative position of the measuring means 204 to the device 202. The device may include a triggering member 216 that triggers the device 202 to read a measurement via the measuring component 214 and transmit that measurement via the wireless transmitter or antenna 206. Alternatively, a measurement may trigger after the measuring means 204 has been stationary for a threshold period, such as 2 or 3 seconds. Alternatively, a height can be transmitted when the measuring means 204 takes a threshold number of periodic and consecutive measurements at the same level.

In an alternative, the device 202 could also be referenced to a top of the container rather than to the surface 208.

Figure 2:
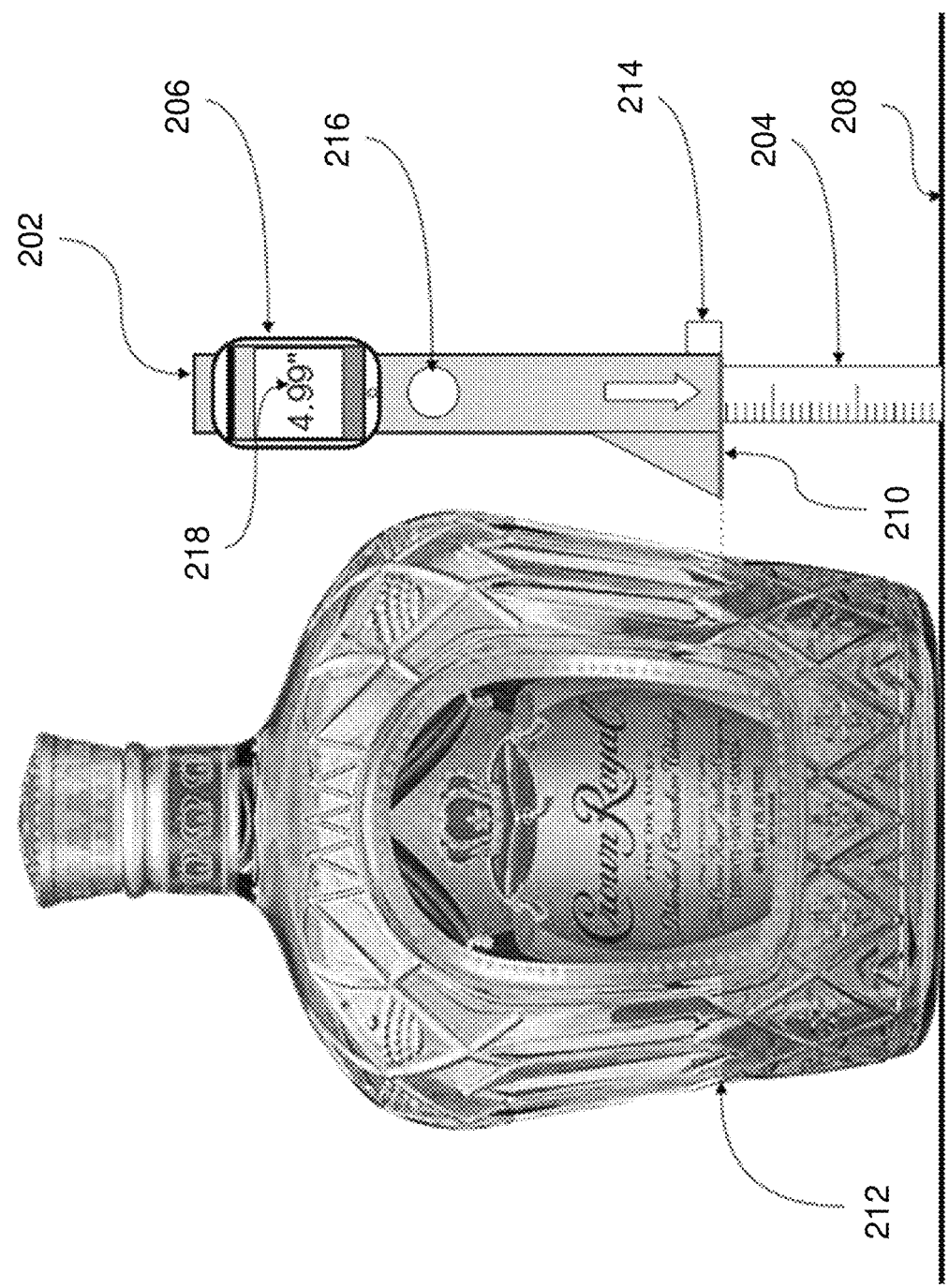
FIG. 2 illustrates an embodiment of a liquid-level indicating device.
Figure 3:
FIG. 3 illustrates another embodiment of a liquid-level indicating device.

FIG. 3 illustrates an alternative liquid-level indicator to FIG. 2, where a laser 304 is used to point to the level of the liquid 306. In this embodiment, the laser 304 could be affixed to a bottom of the measuring device 302.

Figure 4:
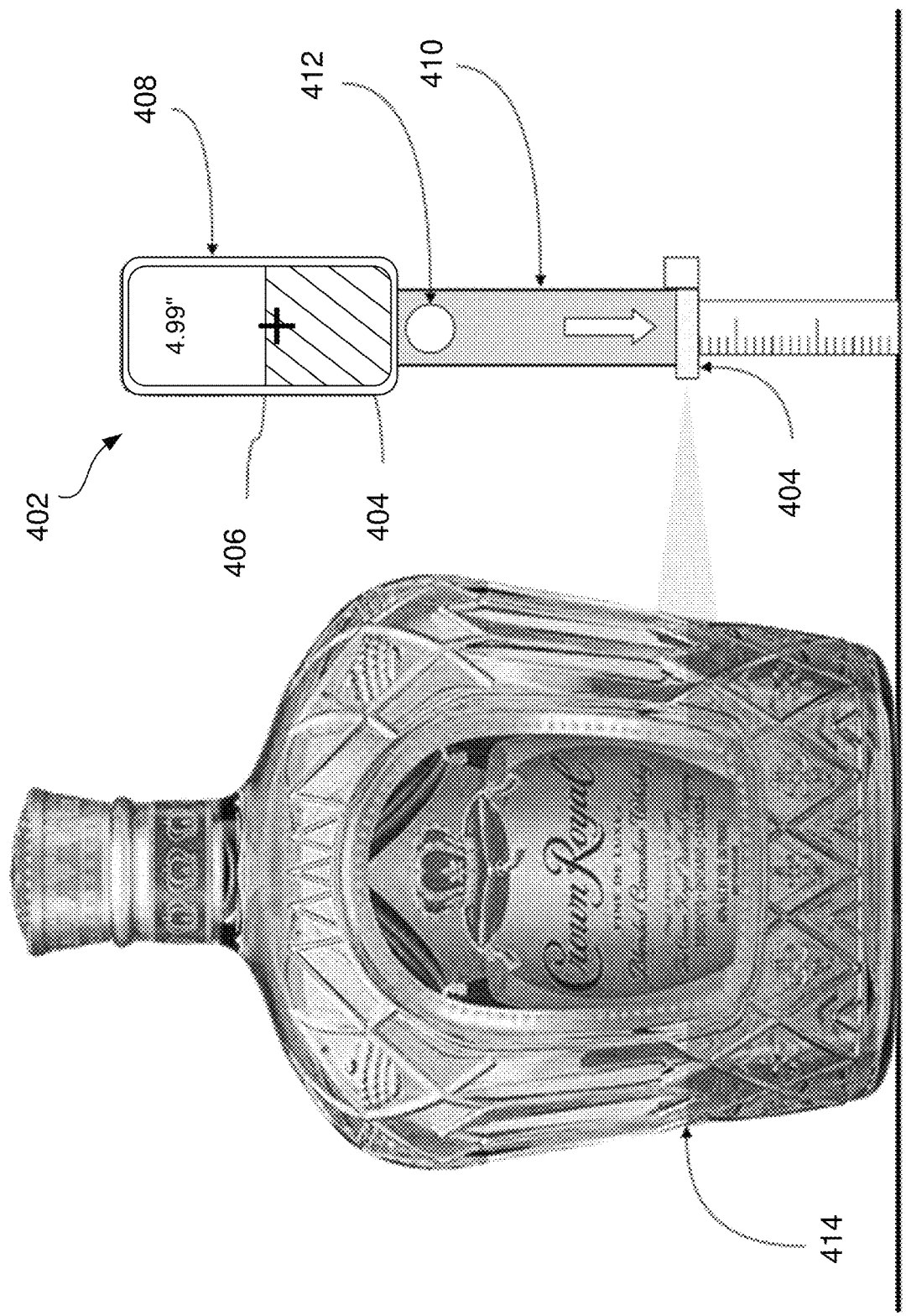
FIG. 4 illustrates another embodiment of a liquid-level indicating device.

Alternatively, a camera could replace the laser of FIG. 3. FIG. 4 shows an embodiment of a liquid-level indicator where a camera 404 is arranged at a bottom of the measuring device 402 and is fixed relative to the measuring device 402. The measuring device 402 could include a display 408 or could wirelessly transmit signals for display on a phone, tablet, laptop or other display. Whatever the form of the display 408, it could include the images recorded by the camera and may include alignment indicators 406, such as a level, such that a user can determine when the measuring device 402 is aligned with the liquid level 414 based on a visual alignment of the display's 408 alignment indicator 406 and the image of the liquid level 414. The user would then press a trigger, such as the button 412, to record and transmit the measurement.

Figure 5:
FIG. 5 illustrates an embodiment of a cell phone or other mobile computing device configured for use as a liquid-level indicating device.

In another alternative, the measuring means 204 seen in FIGS. 2-4 could be replaced with an optical or other wireless form of measuring to the surface 208. For instance, FIG. 5 shows a laser beam 506, transmitted from a laser assembly 508, being used to measure a distance from a bottom of measuring device 502 to a surface 510 upon which the container rests. The laser assembly 508 may include a receiver component that can detect a reflection of the laser beam 506 and thereby determine a distance that the beam 506 traveled. Any of the methods shown in FIGS. 2-4 can be used to align a bottom of the measuring device 502 with the liquid level 512. For instance, a second laser beam could be emitted perpendicularly to the first laser beam 506 (e.g., see 304 in FIG. 3) or a physical structure such as 210 could extend sideways from the measuring device 502.

In this embodiment, the measuring device 502 may be, but is not limited to, a phone, tablet, laptop, smartphone, scanner, camera, e-reader, handheld gaming device, dedicated measurement device, raspberry PI, controller board such as Arduino, single board computer (SBC), or smart watch (e.g., SAMSUNG or APPLE), any of these either including the laser assembly 508 or being configured to have the laser assembly 508 attached to a bottom thereof. Other measuring devices beyond laser are also envisioned. For instance, ultrasonic and millimeter wave devices could also be implemented.

Figure 6:
FIG. 6 illustrates another embodiment of a liquid-level indicating device.

In another embodiment, a measuring device 602 as seen in FIG. 6 of a known length and including a laser or other measuring means, can be employed to determine the liquid level 606. A bottom of the device 602 could rest on a same surface 604 as the container and the other end could touch the container at the liquid level 606, or a laser beam 608 or other wireless means could be directed to a point on the container where the liquid level 606 appears to be. The device 602 would also include circuitry to measure an angle (a) formed between the device 602 and the surface 604 (e.g., an inclinometer or accelerometer). This arrangement forms an implicit right-triangle 610 between a pivot end of the device 602 the point where the laser beam 608 meets the container, and a point on the surface 604 directly below where the laser beam 608 meets the container. With the known length of the device 602 and/or the measured distance to the container with the laser beam 608 or other measuring device, the length (F), or the hypotenuse of a right triangle can be determined, and with the angle (a) the height (E) can be calculated. For instance:

F=length of hypotenuse=length of device or length of device plus measured distance from end of device to point on container where liquid level is (12" for example);
E=height of liquid in container;
a=angle measured by the device (24.5° for example);
b=90° angle of the implicit right triangle;

$$\cos(a) = \frac{F}{E}$$

Therefore, the liquid level, E is:

$$E = \frac{F}{\cos(a)} = 4.99''$$

Figure 7:
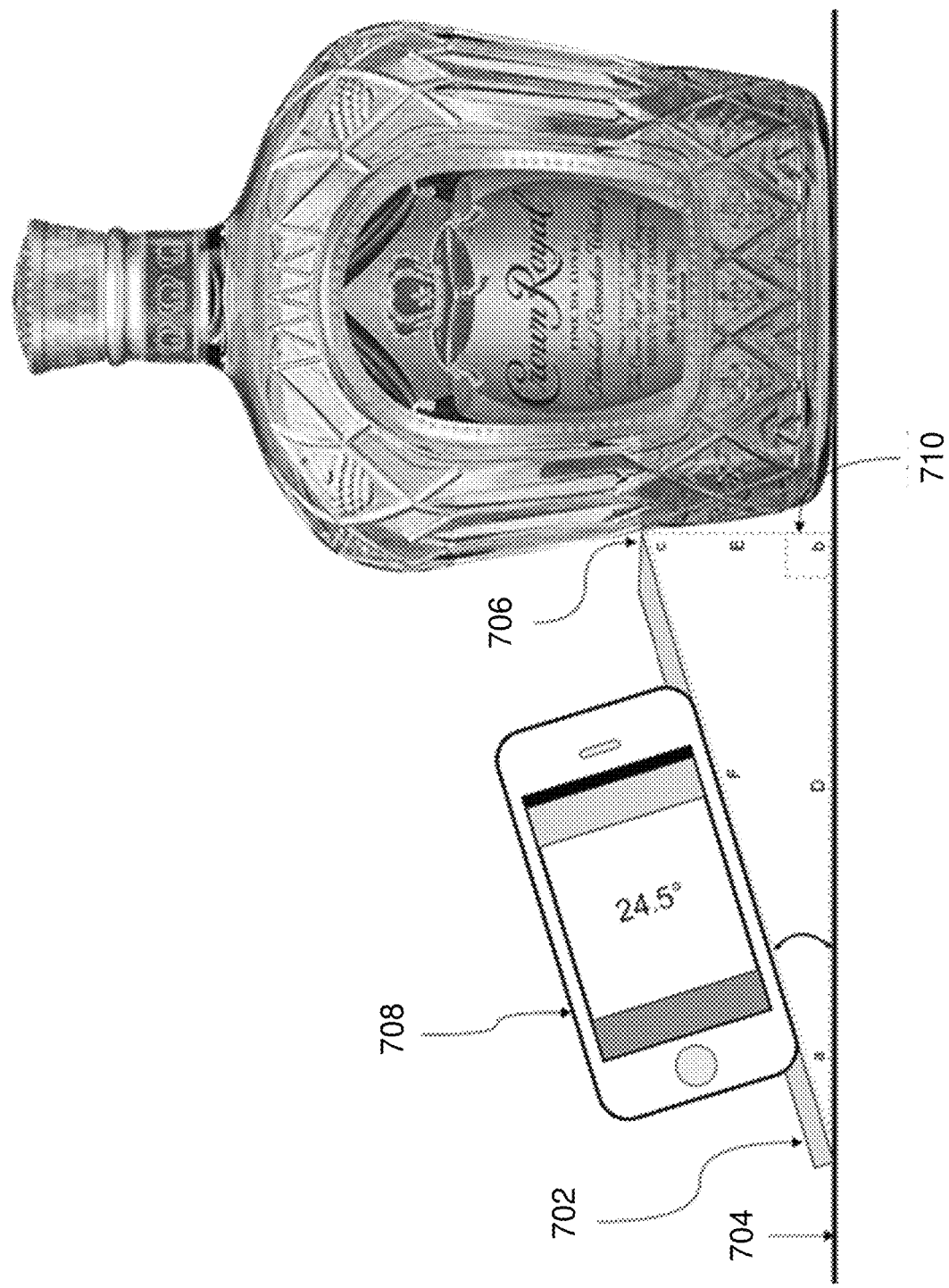
FIG. 7 illustrates yet another embodiment of a liquid-level indicating device

FIG. 7 illustrates another liquid-level indicator for contactless measurement of remaining liquid volume in a container. Here, a computing device 708, is coupled to a device 702 having a known length. One corner of device 702 rests on surface 704 while the other corner touches the container at the liquid level. The computing device 708 can also measure an angle of incline (a), for instance using a gyroscope or accelerometer, to name two non-limiting examples. In an embodiment, the computing device 708 can be an inclinometer. Properties of a triangle, including the angle (a) the hypotenuse length (f), and the leg length (d), to name a few, could be used to determine a liquid height (e) as described relative to FIG. 6.

Volume Determination

Figure 8:
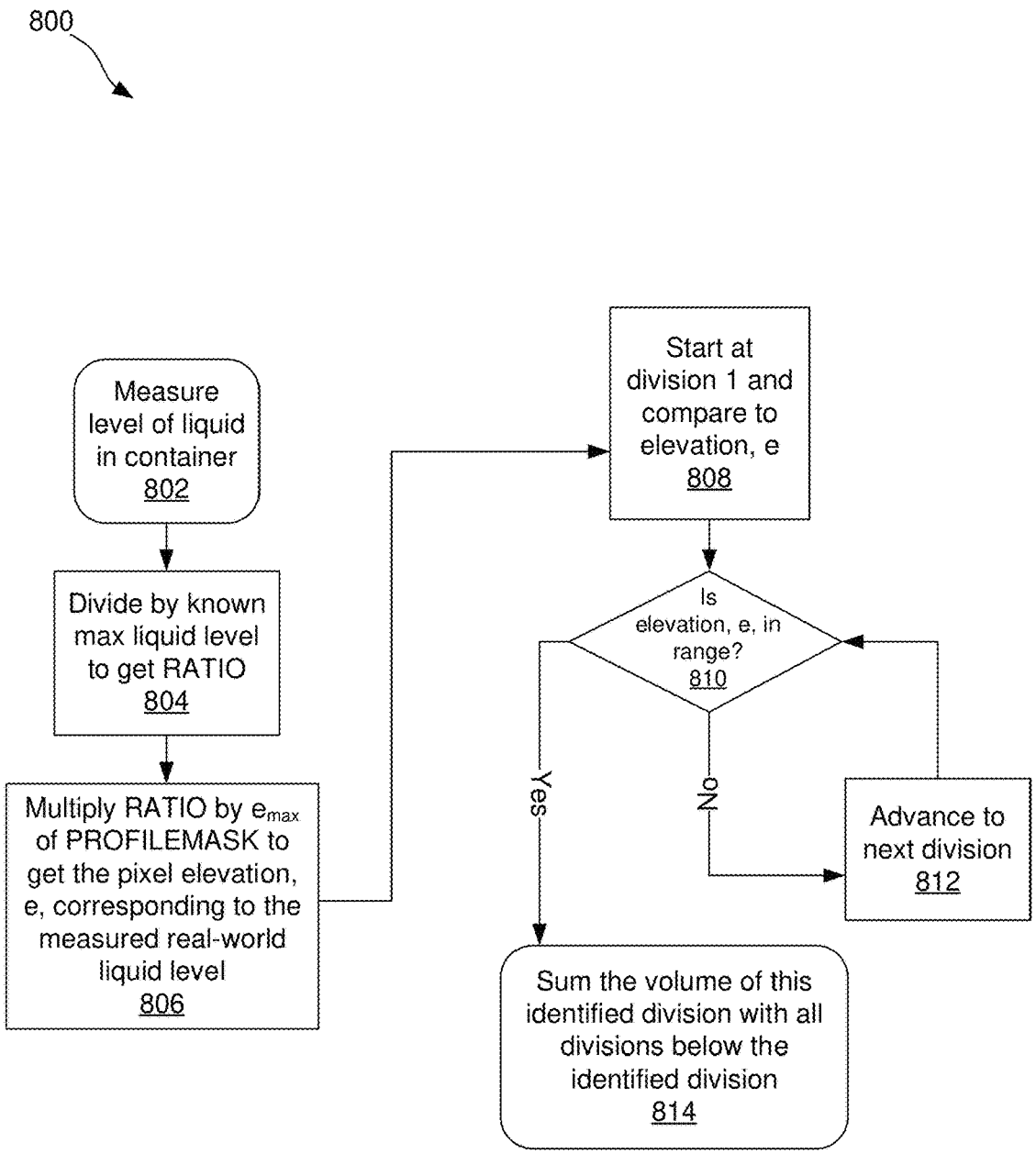
FIG. 8 illustrates a method of determining a volume of liquid in a real container based on a container profile.

FIG. 8 illustrates a method of determining a volume of liquid in a real-world container based on a container profile (e.g., as determined via method 100 or 1600) and a liquid level (e.g., as determined via one of the devices shown in FIGS. 2-7). The method 800 is used to translate the liquid level in a real-world container to a volume estimate based on a container profile for a digital container corresponding to the real-world container. The method 800 can include determining a level of the liquid in the real-world container (Block 802). This can involve a measuring device, such as those shown in FIGS. 2-7, or can include entering a liquid-level indication on a user interface (e.g., see FIG. 17). The profile of the digital container may include a known maximum liquid level of the container, and thus receipt of a liquid-level indication can lead to calculating a RATIO of the liquid-level over the maximum liquid level of the container (Block 804). It should be noted that many containers have a maximum liquid level that is different than a height or vertical extent of the container (e.g., a can has a metal lid, and wine bottles have a cork that extends into the bottle; many containers intentionally leave an air gap at a top of the liquid below a top of the container). Many containers also have a finite height of material below a bottom of the liquid (e.g., a thickness of a bottom of a wine bottle), and thus the height in Blocks 802/804 may account for this loss of potential liquid volume. For instance, in FIG. 9, the MAKER'S 46 bottle has a large region of glass at the bottom of the bottle where there is no liquid. The PROFILE_MASK removes this area of glass from the volume that can be filled with liquid.

The method 800 then converts to a corresponding pixel elevation, e, that can be used to query the profile and estimate a volume in the real-world container. This begins by multiplying the RATIO time the pixel height of the PROFILEMASK (e.g., $e_{max}$) to obtain an elevation, e, in the profile corresponding to the real-world liquid height (Block 806). Iterating through the divisions (Block 808, Decision 810 and Block 812), the method 800 can identify the division that contains the elevation, e, (Decision 810=YES) and sum a volume of this identified division in the profile with the divisions below the identified division (Block 814). For instance, for a 750 mL container split into 10 equal-volume divisions of 75 mL each, and where the level of liquid in the real-world container corresponds to the $6^{th}$ division up from the bottom, the estimated volume of remaining liquid is 450 mL (e.g., 6×75 mL).

FIG. 17 illustrates a user interface used to enter a liquid-level indicator and to optionally switch between two profiles for the same brand/make of container. The user interface 1702 can appear on a cell phone, laptop, tablet or any other user device. The user interface 1702 can show certain elements of a container profile, such as an image 1706 of the container. A name and container size from the profile may also be displayed (though not shown here). The user interface 1702 may include a digital liquid-level indicator 1704 arranged adjacent to the image of the container 1706. The digital liquid-level indicator 1704 is shown as a simple scale and a user can touch a portion of the liquid-level indicator 1704 to indicate a liquid level in the real-world container. For instance, the user may observe that the liquid level is just above the top of the BAKER'S label and thus may tough a portion of the liquid-level indicator 1704 that is just above the BAKER'S label in the digital image. The device can convert this touch to an elevation, e, or pixel row in the profile and then use that elevation, e, as described with reference to FIG. 16, to estimate a volume of liquid remaining in the real-world container represented by the digital image 1706.

Figure 17B:
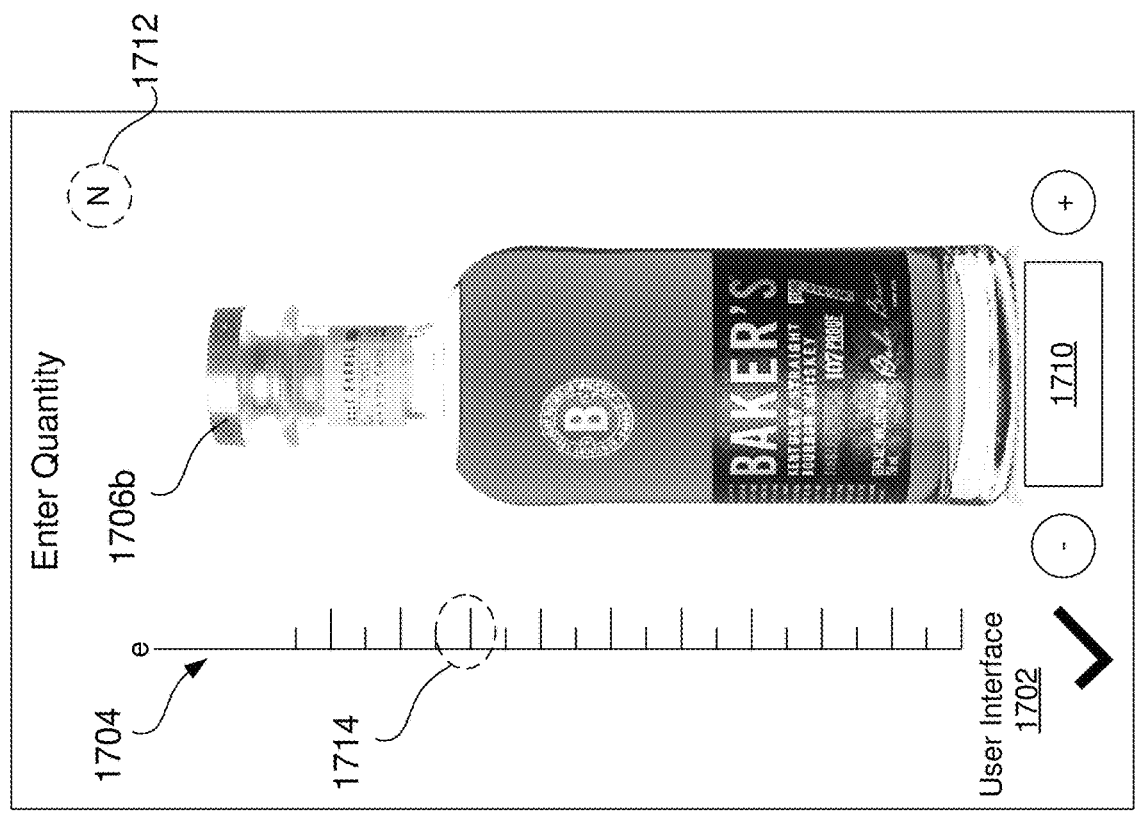
FIGS. 17A and 17B show an embodiment of a user interface for indicating a liquid level of a real-world container.
Figure 17A:
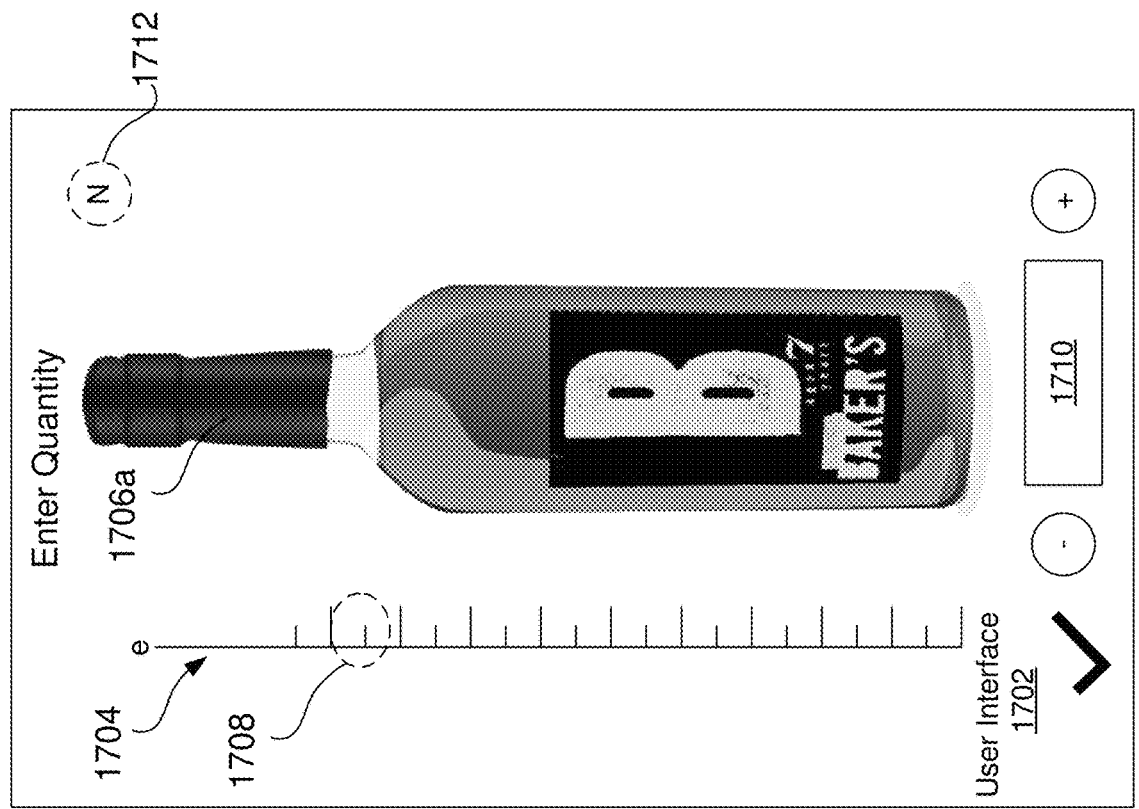
Figure 19:
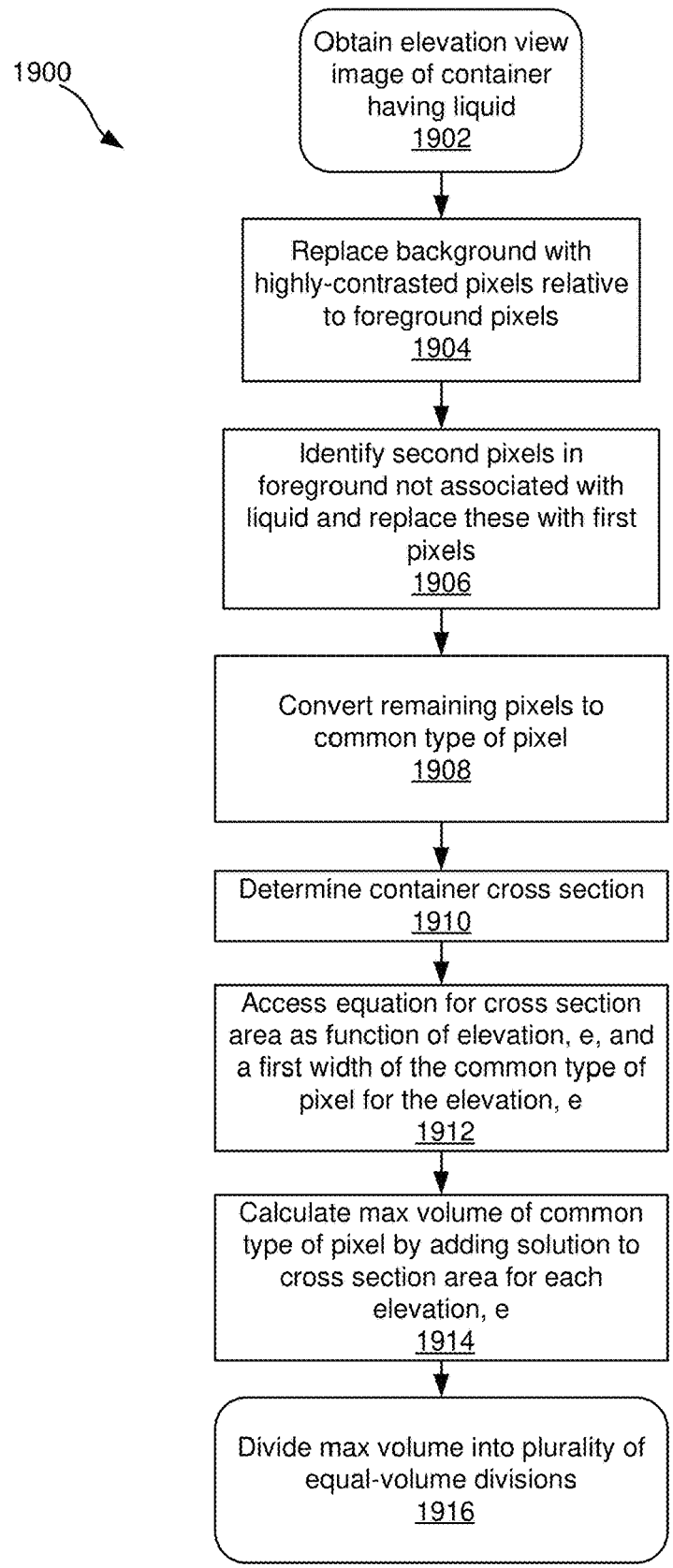
FIG. 19 illustrates a method of generating a container profile that can be used to estimate a volume of liquid in a real-world container modeled by the profile.
Figure 20:
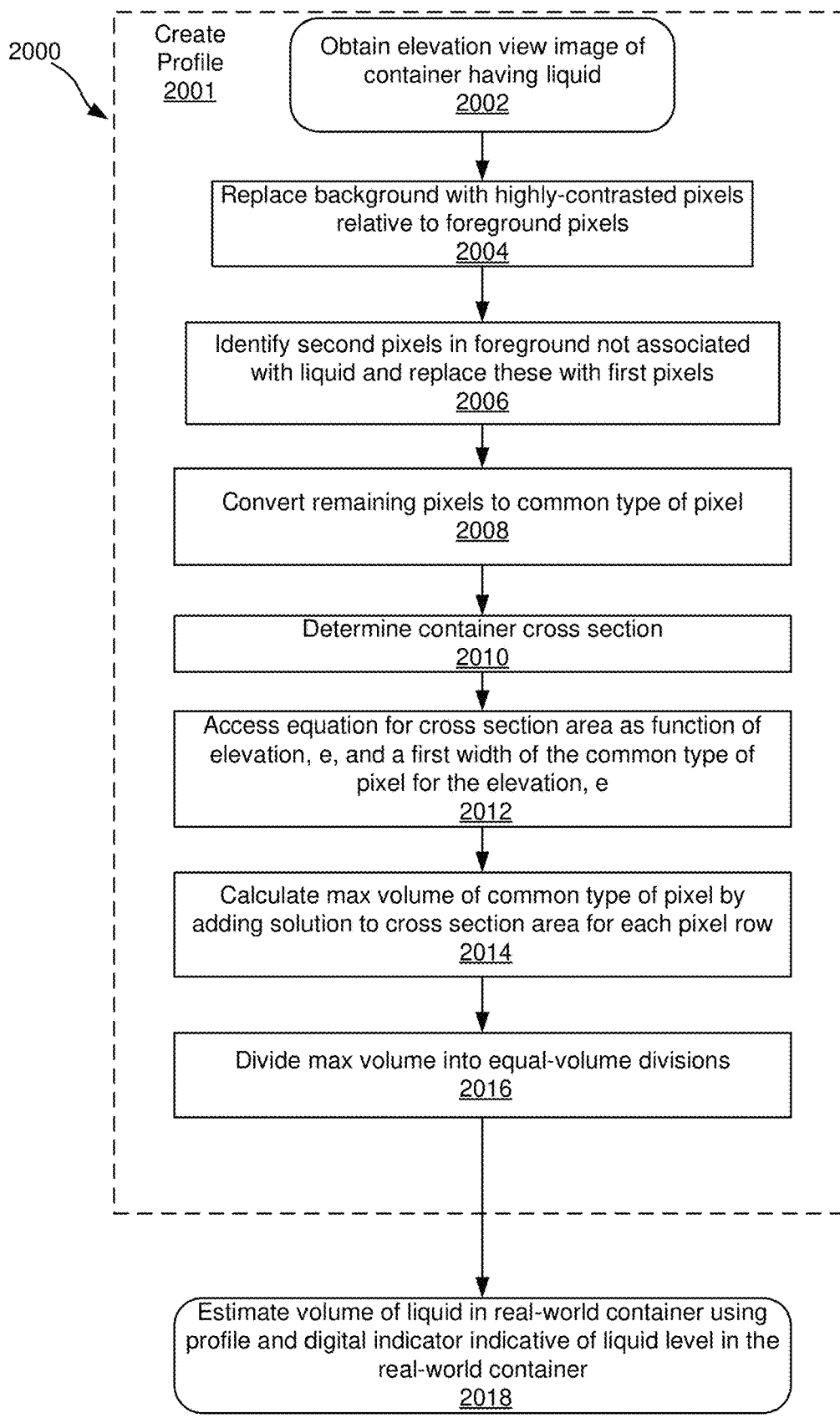
FIG. 20 illustrates a method of contactless estimation of a volume of liquid in a real-world container.
Figure 21:
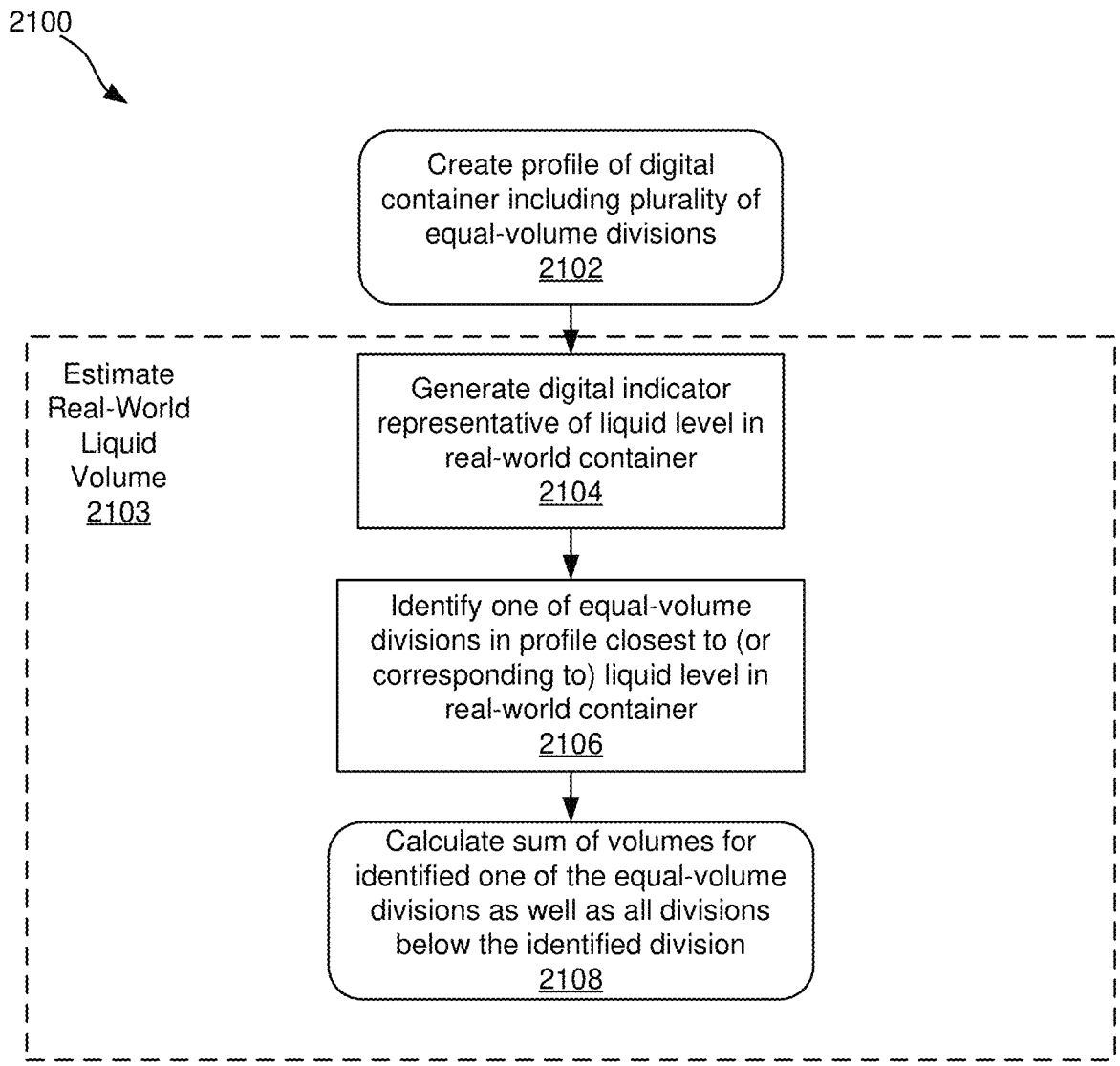
FIG. 21 illustrates a method contactless estimation of a volume of liquid in a real-world container.

In some embodiments, there may be different container shapes/sizes for the same liquid, such as the two different BAKER'S 7 bottles shown in FIGS. 17A and 17B. The user interface 1702 may enable the user to select between multiple profiles for a liquid. In the illustrated user interface 1702, a button 1712 with a number, N, of different profiles for a liquid (e.g., 2), can be selected to switch between different profiles. When this button 1712 is selected, another user interface 1802 as seen in FIG. 18 may be used to choose between the N different profiles.

In some case, a user may desire to adjust a liquid level with greater precision, and may use the input box 1710 to either enter a liquid level 1708 or use the "+" or "−" toggle controls to adjust a liquid level 1708. The input box 1710 can also display a numeric representation of the level 1708 that the user selected on the liquid-level indicator 1704. When the user is satisfied with their selection, the checkmark or another confirmation button can be pressed triggering a numeric value of the liquid-level to be used to estimate a volume of liquid remaining in the real-world container.

It should be noted that the liquid-level indicator can be displayed in a variety of forms. For instance, any of the devices in FIGS. 2-7 can have a digital image representation that can be used in place of the scale shown in FIG. 17.

In some embodiments, a user can use either a mechanical measurement device such as shown in FIGS. 2-7 or a user-interface-based input as shown in FIG. 17.

Figure 15:
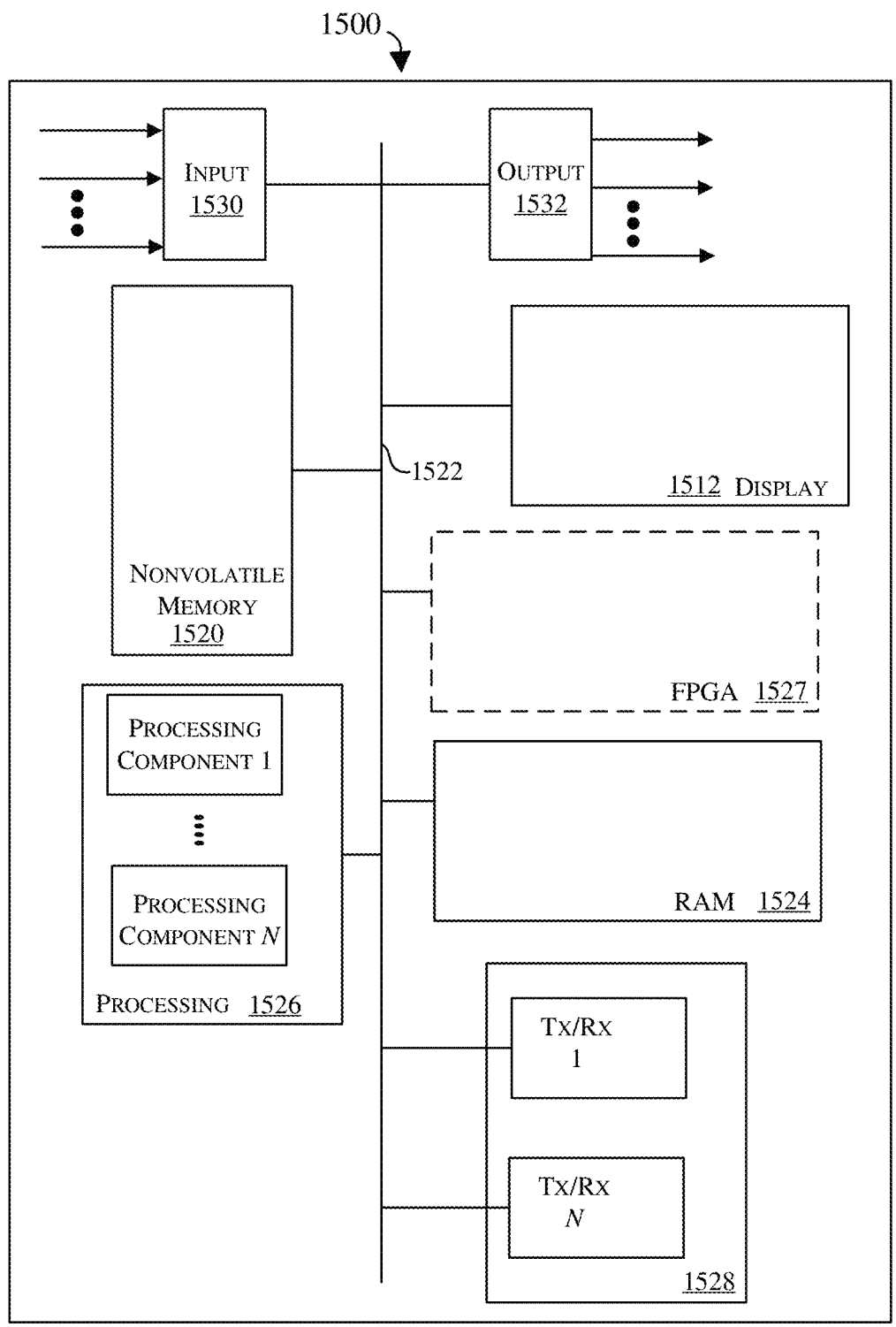
FIG. 15 is a block diagram depicting physical components that may be utilized to realize the device for measuring liquid levels in a container according to an exemplary embodiment.

The methods described in connection with the embodiments disclosed herein may be embodied directly in hardware, in processor-executable code encoded in a non-transitory tangible processor readable storage medium, or in a combination of the two. Referring to FIG. 15 for example, shown is a block diagram depicting physical components that may be utilized to realize the device for measuring liquid levels in a container according to an exemplary embodiment. As shown, in this embodiment a display portion 1512 and nonvolatile memory 1520 are coupled to a bus 1522 that is also coupled to random access memory ("RAM") 1524, a processing portion (which includes N processing components) 1526, an optional field programmable gate array (FPGA) 1527, and a transceiver component 1528 that includes N transceivers. Although the components depicted in FIG. 15 represent physical components, FIG. 15 is not intended to be a detailed hardware diagram; thus, many of the components depicted in FIG. 15 may be realized by common constructs or distributed among additional physical components. Moreover, it is contemplated that other existing and yet-to-be developed physical components and architectures may be utilized to implement the functional components described with reference to FIG. 15.

This display portion 1512 generally operates to provide a user interface for a user, and in several implementations, the display is realized by a touchscreen display. In general, the nonvolatile memory 1520 is non-transitory memory that functions to store (e.g., persistently store) data and processor-executable code (including executable code that is associated with effectuating the methods described herein). In some embodiments for example, the nonvolatile memory 1520 includes bootloader code, operating system code, file system code, and non-transitory processor-executable code to facilitate the execution of a method described with reference to FIG. 8 described further herein.

In many implementations, the nonvolatile memory 1520 is realized by flash memory (e.g., NAND or ONENAND memory), but it is contemplated that other memory types may be utilized as well. Although it may be possible to execute the code from the nonvolatile memory 1520, the executable code in the nonvolatile memory is typically loaded into RAM 1524 and executed by one or more of the N processing components in the processing portion 1526.

The N processing components in connection with RAM 1524 generally operate to execute the instructions stored in nonvolatile memory 1520 to enable a device to measure a liquid level in a container and estimate a volume of liquid remaining in the container based on this measurement. For example, non-transitory, processor-executable code to effectuate the methods described with reference to FIG. 8 may be persistently stored in nonvolatile memory 1520 and executed by the N processing components in connection with RAM 1524. As one of ordinarily skill in the art will appreciate, the processing portion 1526 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1526 may be configured to effectuate one or more aspects of the methodologies described herein (e.g., the method described with reference to FIG. 8). For example, non-transitory processor-readable instructions may be stored in the nonvolatile memory 1520 or in RAM 1524 and when executed on the processing portion 1526, cause the processing portion 1526 to measure a liquid level in a container and estimate a volume of liquid remaining in the container based on this measurement. Alternatively, non-transitory FPGA-configuration-instructions may be persistently stored in nonvolatile memory 1520 and accessed by the processing portion 1526 (e.g., during boot up) to configure the hardware-configurable portions of the processing portion 1526 to effectuate the functions of the device for measuring a liquid level in a container.

The input component 1530 operates to receive signals (e.g., a laser reflection from a container or a voltage signal from a sliding scale that telescopes within the measuring device) that are indicative of one or more aspects of the container liquid level. The signals received at the input component may include, for example, a voltage or an optical reflection, to name two non-limiting examples. The output component generally operates to provide one or more analog or digital signals to effectuate an operational aspect of the device for measuring liquid level in a container. For example, the output portion 1532 may provide a volume estimate described with reference to FIGS. 1-8. Sometimes the liquid level measurement can be wireless transmitted to a remote computer for processing to estimate the volume of liquid remaining.

The depicted transceiver component 1528 includes N transceiver chains, which may be used for communicating with external devices via wireless or wireline networks. Each of the N transceiver chains may represent a transceiver associated with a communication scheme (e.g., WiFi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of generating a profile for a container, the method comprising:
   obtaining an elevation view image of a container having liquid therein;
   replacing a background of the elevation view image with first pixels that are highly contrasted relative to a foreground of the elevation view image;
   identifying second pixels in the foreground of the elevation view image not associated with the liquid in the container and replacing the second pixels not associated with the liquid in the container with the first pixels that are highly contrasted pixels;

converting remaining pixels that are not the first pixels of the elevation view image to a common type of pixel;

determining a cross-sectional shape of the container;

accessing an equation for an area of the cross-sectional shape as a function of an elevation, e, and a first width of the common type of pixel in the elevation view image at the elevation, e;

calculating a maximum volume associated with the common type of pixel by adding together solutions to the equation at each row of the common type of pixel; and dividing the maximum volume into the plurality of equal-volume divisions, wherein the profile comprises the elevation view image, the maximum volume associated with the common type of pixel, a number of the plurality of equal-volume divisions, and a volume per equal-volume division.

2. The method of claim 1, further comprising applying a weighting to the common type of pixels, where the weighting represents a depth of a side of the container via an alpha or greyscale value.

3. The method of claim 1, further comprising identifying the elevation, e, at a top of each of the equal-volume divisions.

4. The method of claim 3, further comprising summing areas of succeeding slices within one of the equal-volume divisions until a target pixel count is reached that corresponds to a volume of each of the equal-volume divisions.

5. The method of claim 1, wherein the container has an asymmetric cross section, and the method further comprises obtaining a second elevation view image of the container at substantially 90° from the elevation view image of the container and the determine the cross-sectional shape of the container is based on the first width of pixels in the elevation view image and a second width of pixels in the second elevation view image.

6. A method of contactless estimation of a volume of liquid in a real-world container, the method comprising:

creating a profile of a digital container by:

obtaining an elevation view image of a second real-world container having liquid therein;

replacing a background of the elevation view image with pixels that are highly contrasted relative to a foreground of the elevation view image;

replacing pixels in the foreground of the elevation view image with a common type of pixel;

identifying pixels in the foreground not associated with the liquid in the digital container and replacing the pixels not associated with the liquid in the digital container with the pixels that are highly contrasted;

determining a cross-sectional shape of the digital container;

accessing an equation for an area of the cross-sectional shape as a function of the elevation, e, and a width of the common type of pixels in the elevation view image at the elevation, e;

calculating a maximum volume associated with the common type of pixels by adding together solutions to the equation at each row of the common type of pixels; and dividing the maximum volume into equal-volume divisions, wherein the profile comprises the elevation view image, the maximum volume associated with the common type of pixels, a number of the equal-volume divisions, and a volume per equal-volume division; and estimating a volume of liquid in the real-world container using the profile and a digital indicator indicative of a liquid level in the real-world container.

7. The method of claim 6, further comprising applying a weighting to the common type of pixels, where the weighting represents a depth of a side of the digital container via an alpha or greyscale value.

8. The method of claim 6, further comprising identifying the elevation, e, at a top of each of the equal-volume divisions.

9. The method of claim 8, further comprising summing areas of succeeding slices within a given one of the equal-volume divisions until a target pixel count is reached that corresponds to a volume of each of the equal-volume divisions.

10. The method of claim 6, wherein the digital container has an asymmetric cross section, and the method further comprises obtaining a second elevation view image of the second real-world container at substantially 90° from the elevation view image of the second real-world container and the determine the cross-sectional shape of the digital container is based on the first width of pixels in the elevation view image and a second width of pixels in the second elevation view image.

11. The method of claim 6, wherein the digital indicator is generated by a user touching a liquid-level indicating shape displayed adjacent to the elevation view image.

12. The method of claim 6, wherein the digital indicator is generated by a user entering a numeric value into a device comprising the user interface.

13. The method of claim 6, wherein the digital indicator is generated in response to movement of a mechanical liquid-level indicator to a position in line with the liquid level in the real-world container.

14. A method of contactless estimation of a volume of liquid in a real-world container, the method comprising:

creating a profile of a digital container comprising a plurality of equal-volume divisions; and estimating the volume of liquid in the real-world container corresponding to the digital container by:

generating a digital indicator representative of a liquid level in the real-world container;

identifying one of the plurality of equal-volume divisions in the profile that is closest to the liquid level in the real-world container; and calculating a sum of volumes for the identified one of the plurality of equal-volume divisions as well as ones of the equal-volume divisions below the identified one of the plurality of equal-volume divisions to estimate the volume of liquid in the real-world container.

15. The method of claim 14, wherein creating the profile of the digital container comprises:

obtaining a first image of a second real-world container substantially similar to the real-world container;

replacing a background of the first image with first pixels that are highly contrasted relative to a foreground of the first image;

identifying second pixels in the foreground of the first image not associated with the liquid in the digital container and replacing the second pixels not associated with the liquid in the digital container with the first pixels that are highly contrasted;

converting remaining pixels that are not the first pixels of the first image to a common type of pixel;

determining a cross-sectional shape of the digital container;

accessing an equation for an area of the cross-sectional shape as a function of an elevation, e, and a first width of the common type of pixel in the first image at the elevation, e;

calculating a maximum volume associated with the common type of pixel by adding together solutions to the equation at each row of the common type of pixel; and dividing the maximum volume into the plurality of equal-volume divisions, wherein the profile comprises the first image of the second real-world container, the maximum volume associated with the common type of pixel, a number of the plurality of equal-volume divisions, and a volume per equal-volume division.

16. The method of claim 15, wherein the plurality of equal-volume divisions are determined using a first image of a second real-world container substantially similar to the real-world container, and an equation for an area of a cross-sectional shape associated with the digital container as a function of (1) an elevation, e, along a vertical dimension of the digital container, and (2) a first width of the common type of pixel in the first image at the elevation, e.

17. The method of claim 16, wherein the plurality of equal-volume divisions are determined using a second image of the second real-world container captured at substantially 90° to the first image of the digital container.

18. The method of claim 17, further comprising:

replacing a background of the second image with the first pixels that are highly contrasted relative to a foreground of the second image;

identifying second pixels in the foreground of the second image not associated with the liquid in the digital container and replacing the second pixels not associated with the liquid in the digital container with the first pixels that are highly contrasted;

converting remaining pixels that are not the first pixels of the second image to a common type of pixel;

wherein the equation is also a function of a second width of the common type of pixel in the second image at the elevation, e.

19. The method of claim 15, wherein the generating the digital indicator comprises:

displaying the first image; and generating the digital indicator in response to a user's interaction with a digital liquid-level indicator displayed adjacent to the first image, the user's interaction configured to indicate a liquid level in the real-world container.

20. The method of claim 15, wherein the generating the digital indicator comprises moving a mechanical liquid-level indicator to a position in line with a liquid level in the real-world container.

* * * * *